US006643368B1

(12) United States Patent
Watanabe

(10) Patent No.: US 6,643,368 B1
(45) Date of Patent: Nov. 4, 2003

(54) DISTRIBUTED CONTROL EXCHANGE

(75) Inventor: Tomoyuki Watanabe, Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/501,956

(22) Filed: Feb. 10, 2000

(30) Foreign Application Priority Data

Feb. 15, 1999 (JP) .......................................... 11-035837

(51) Int. Cl.⁷ ................................................ H04M 3/00
(52) U.S. Cl. ...................................... 379/269; 379/271
(58) Field of Search ................................ 379/269, 270, 379/271, 272, 273, 274, 279

(56) References Cited

U.S. PATENT DOCUMENTS

| | | | | | |
|---|---|---|---|---|---|
| 4,694,487 A | * | 9/1987 | Chang et al. | ................ | 379/269 |
| 4,827,499 A | * | 5/1989 | Warty et al. | ................. | 455/560 |
| 4,974,256 A | * | 11/1990 | Cyr et al. | ............... | 379/112.04 |
| 6,061,442 A | * | 5/2000 | Bhat | ........................... | 379/269 |

* cited by examiner

Primary Examiner—Harry S. Hong
(74) Attorney, Agent, or Firm—Katten Muchin Zavis Rosenman

(57) ABSTRACT

A distributed control exchange according to the present invention is provided with a plurality of sections for executing, in the form of a distributed process, a call process for a call occurred at an individual line. When a call has occurred at a certain line, one of these sections that executes a call process relating to that line also executes, based on a result of routing, a call process relating to a line to become a destination party. Therefore, the distributed control exchange according to the invention can reduce the resources that are used for cooperation of the plurality of sections and enables stable load distribution. Further, the distributed control exchange realizes cost reduction and improvement of reliability.

22 Claims, 11 Drawing Sheets

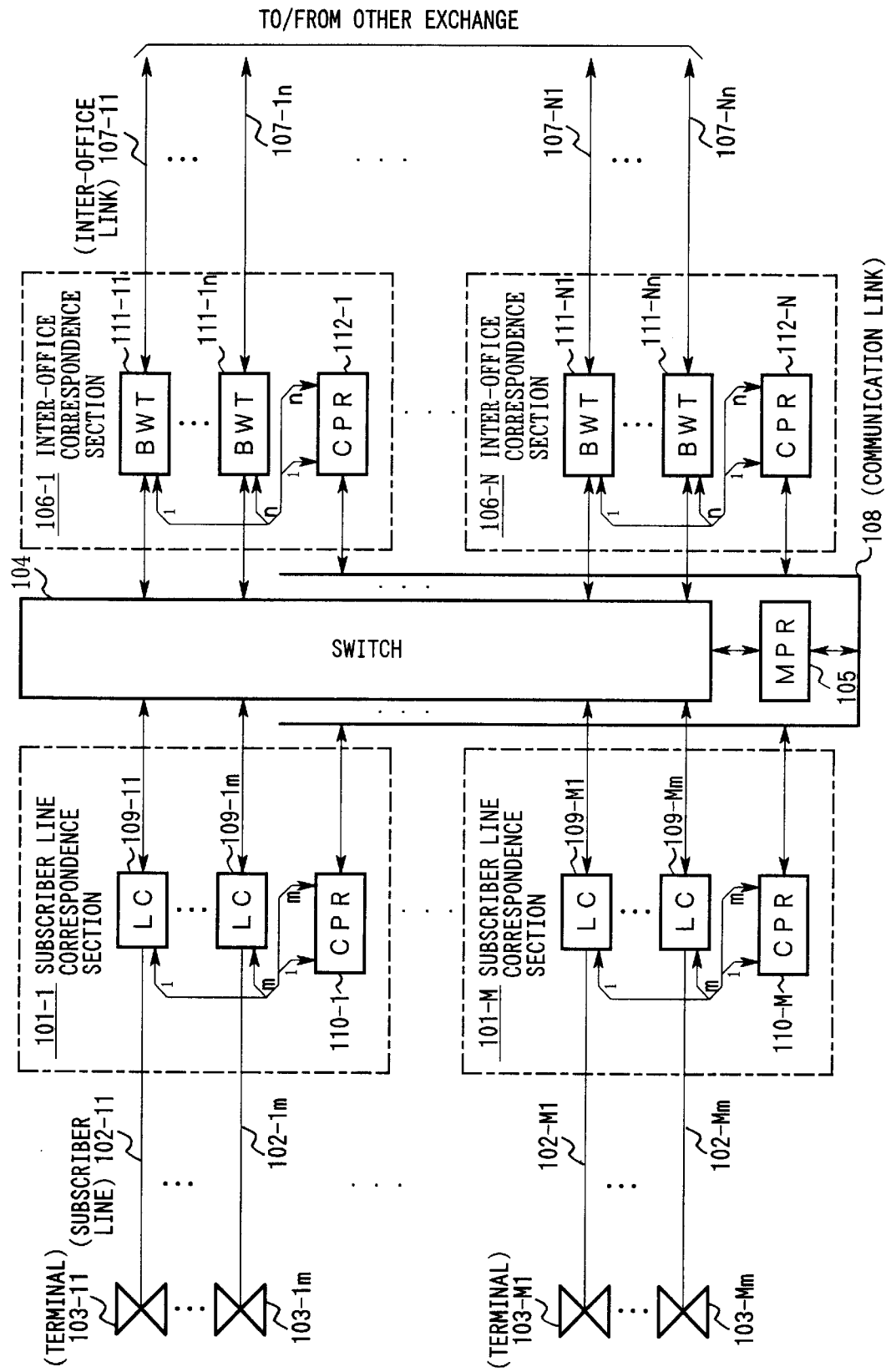

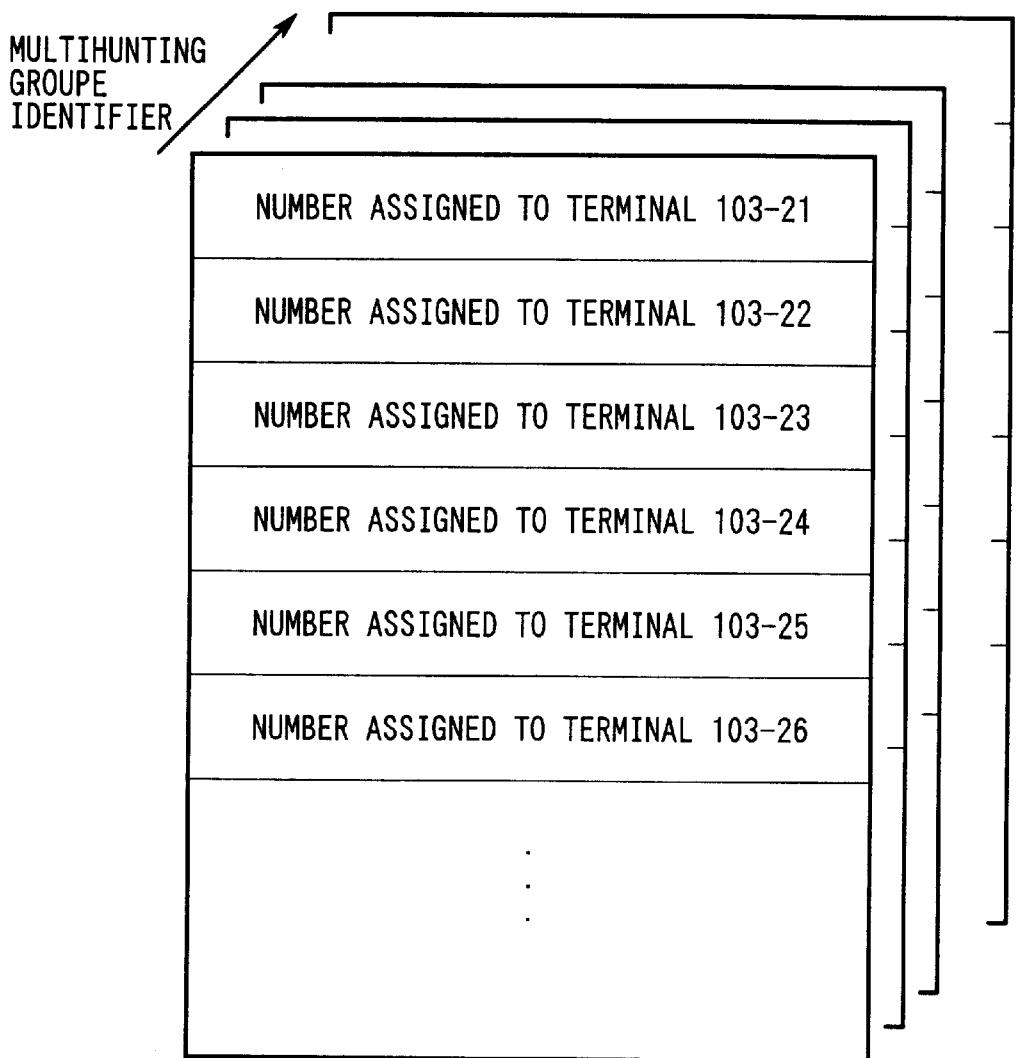

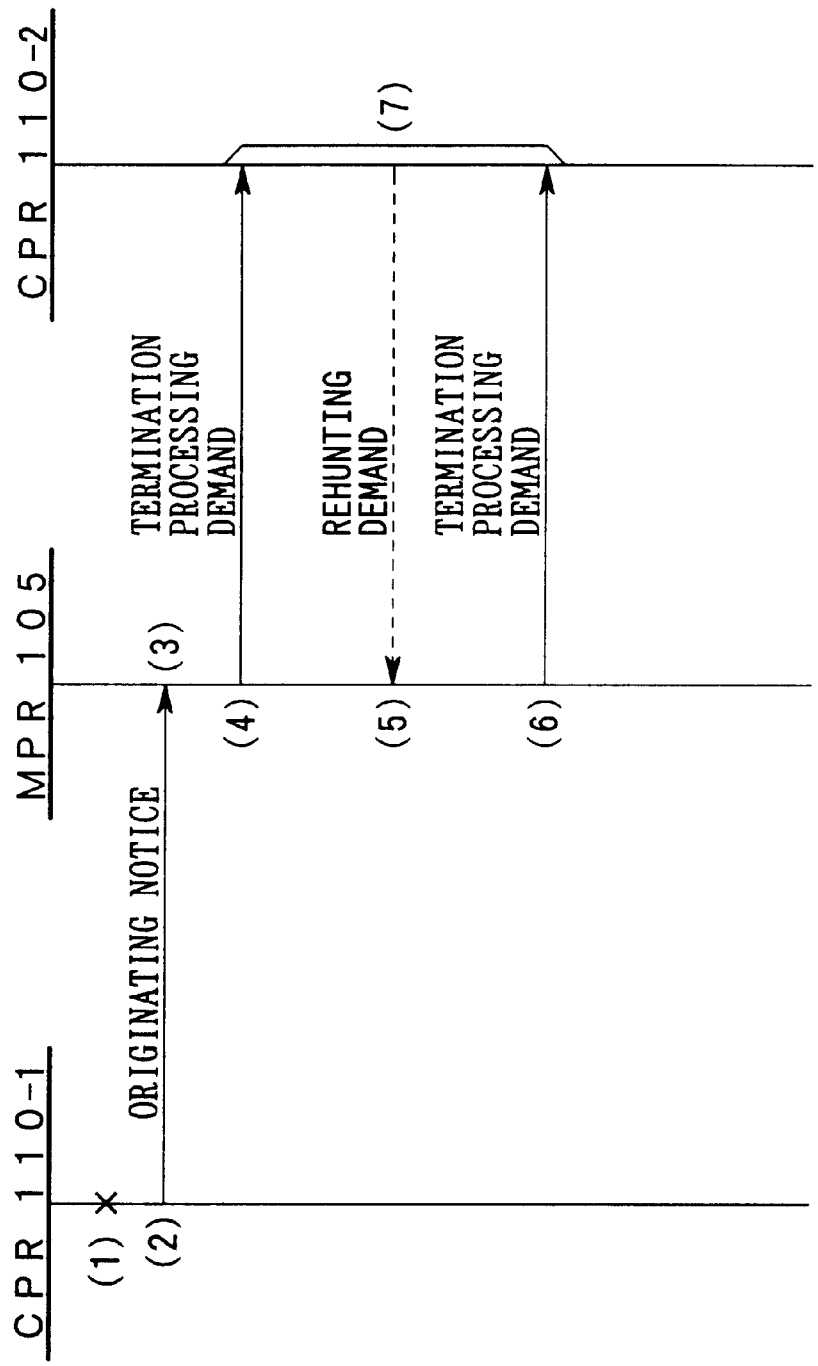

DISTRIBUTED CONTROL EXCHANGE

BACKGROUND OF THE INVENTION

1. Field of the Invention

The present invention relates to an exchange consisting of packages and/or subsystems that operate individually under a plurality of cooperative processors and share prescribed loads.

2. Description of the Related Art

In recent years, the added value of exchanges that constitute a major component of a public network or a LAN has been increased through application of a high-level information processing technology and transmission technology to it. And such exchanges are now making it possible to provide a variety of communication services.

In many of such exchanges, the hardware and the software have been standardized to flexibly adapt to an increase in the number of terminals to be accommodated and a variety of services to be provided to these terminals as well as to make the maintenance and operation more efficient. And many of such exchanges are configured as a set of packages and subsystems that share prescribed loads and functions under a plurality of interfacing processors.

FIG. 9 is a block diagram showing the configuration of an exchange in which load distribution and functional distribution are made.

In FIG. 9, subscriber line correspondence section 101-1 to 101-M are connected to terminals 103-11 to 103-1m, . . . , and 103-M1 to 103-Mm via subscriber lines 102-11 to 102-1m, . . . , and 102-M1 to 102-Mm, respectively, and also connected to corresponding ports of a switch 104. A control terminal of the switch 104 is connected to a corresponding input/output terminal of a main processor (hereinafter abbreviated as MPR) 105. Inter-office link correspondence sections 106-1 to 106-N are connected to respective inter-office links 107-11 to 107-1n, . . . , and 107-N1 to 107-Nn that are provided between the exchange and other exchanges (not shown), and also connected to corresponding ports of the switch 104. The subscriber line correspondence sections 101-1 to 101-M, the MPR 105, and the inter-office link correspondence sections 106-1 to 106-N are connected to a communication link 108.

The subscriber line correspondence section 101-1 is composed of subscriber line interface sections (LCs) 109-11 to 109-1m that are disposed individually between the subscriber lines 102-11 to 102-1m and corresponding ports of the switch 104, and a call processing processor (hereinafter abbreviated as CPR) 110-1 having a communication port that is connected to the communication link 108 as well as input/output ports (or communication ports) that are connected to input/output terminals of the respective subscriber line interface sections 109-11 to 109-1m.

Since the subscriber line correspondence sections 101-2 to 101-M are configured in the same manner as the subscriber line correspondence section 101-1, the components of the former are given reference numerals that are the same as the reference numerals of the corresponding components of the latter and that have first suffixes "2" to "M" and descriptions therefor will be omitted in the following.

The inter-office link correspondence section 106-1 is composed of inter-office link interface sections (BWTs) 111-11 to 111-1n that are disposed individually between the inter-office links 107-11 to 107-1n and corresponding ports of the switch 104, and a call processing processor (hereinafter abbreviated as CPR) 112-1 having a communication port that is connected to the communication link 108 as well as I/O ports (or communication ports) that are connected to input/output terminals of the respective inter-office link interface sections 111-11 to 111-1n.

Since the inter-office link correspondence sections 106-2 to 106-N are configured in the same manner as the inter-office link correspondence section 106-1, the components of the former are given reference numerals that are the same as the reference numerals of the corresponding components of the latter and that have first suffixes "2" to "N" and descriptions therefor will be omitted in the following.

In the conventional exchange having the configuration described above, as shown in FIG. 10, a pilot number selection list 105L that accommodates in advance, for each multihunting group, a combination of the numbers of terminals to be candidates for a destination party of a call as an object of a pilot number service (i.e., a pilot number service call) among the terminals 103-11 to 103-1m, . . . , and 103-M1 to 103-Mm and that have been generated as a part of office data are allocated in a particular storage area of a main memory of the MPR 105.

For example, when the terminal 103-11 among the terminals 103-11 to 103-1m, . . . , and 103-M1 to 103-Mm originates addressing to the terminal 103-21 that belongs to a multihunting group. indicated by a multihunting group identifier "2" (indicated as (1) in FIG. 11), the CPR 1101 recognizes the occurrence of the originating call that is corresponding, and captures a number to be dialed that has been set by the terminal 103-11 via the subscriber line 102-11.

Then, the CPR 110-1 performs code translation on the above number to be dialed, and transmits an originating notice including a result of the code translation to the MPR 105 via the communication link 108 (indicated as (2) in FIG. 11).

Upon recognizing the originating notice, the MPR 105 searches for a record containing, in some field, the same number as the number to be dialed that is included in the originating notice among the records of the pilot number selection list 105L.

When such a record exists, the MPR 105 identifies the numbers that are contained in the record (for the sake of simplicity, they are assumed here to be numbers that are assigned individually to the terminals 103-21 to 103-26), and then identifies the subscriber line correspondence section 101-2 having the subscriber line interface sections 109-21 to 109-26 that are connected to the respective terminals 103-21 to 103-26 by referring to office data by using these numbers as a key (indicated as (3) in FIG. 11).

Then, the MPR 105 acquires a unique address that is assigned in advance, as a node connected to the communication link 108, to the CPR 110-2 of the subscriber line correspondence section 101-2, and executes the first pilot number service process described as follows.

In the pilot number service process, the MPR 105 transmits, to the CPR 110-2 that is indicated by the unique address, via the communication link 108, a termination processing demand that includes the one number that is listed at the top of the record above-described and means that a termination process described later should be activated (indicated as (4) in FIG. 11).

When the MPR 105 receives a rehunting demand meaning that it is impossible to terminate to the terminal that is assigned such a number in a prescribed period starting from that time point (indicated as (5) in FIG. 11), as long as there are remaining numbers included in the record, the MPR 105 transmits, to the CPR 110-2, a termination processing demand as well including the one following number among the remaining numbers as meaning that a termination process should be activated (indicated as (6) in FIG. 11).

On the other hand, when the CPR 110-2 recognizes the termination processing demand described above, it executes a prescribed termination process that is necessary to terminate to the terminal that is connected to the subscriber line that is assigned the number included in the termination processing demand (hereinafter referred to as "candidate for the called terminal"), among the subscriber lines 102-21 to 102-2$m$ that are accommodated via the subscriber line interface sections 109-21 to 109-2$m$ (indicated as (7) in FIG. 11).

In the termination process, the CPR 110-2 judges whether termination to the candidate for the called terminal is possible. When the judgment result is false, the CPR 1102 transmits a rehunting demand described above to the MPR 105 via the communication link 108.

Furthermore, termination to the candidate for the called terminal described above can not be achieved not only when a certain preceding call has occurred to the candidate for the called terminal but also, for example, when the candidate for the called terminal is removed or kept in an off-hook state.

Detailed description of each processing procedure in the termination process described above and processes executed in parallel during the termination process by the CPR 110-1 and the MPR 105 that cooperate with the CPR 110-2 and the communication link 108 will be omitted here because they are realized by using various known prior art and because they are not the novel features of the invention.

By the way, the first pilot number service process described above may be replaced by the second pilot number service process that is different from the first pilot number service process in that the CPR 110-2 and the MPR 105 cooperate with each other described as follows.

The MPR 105 has, in a particular storage area of the main memory, state registers that indicate the states of the individual subscriber lines 102-11 to 102-11$m$, . . . , and 102-M1 to 102-Mm (terminals 103-11 to 103-1$m$, . . . , and 103-M1 to 103-Mm) that are connected to the respective CPRs 110-1 to 110-M.

Each of the CPRs 110-1 to 110-M has, in a particular storage area of the main memory, state registers that indicate similar states of the individual subscriber lines 102-11 to 102-1$m$, . . . , and 102-M1 to 102-Mm.

Further, each of the CPRs 110-1 to 110-M executes a call process to a call that occurred at the subscriber lines 102-11 to 102-1$m$, . . . , and 102-M1 to 102-Mm while cooperating with the MPR 105 and another CPR opposing each other via the communication link 108. When a state register described above is updated during the call process, each of the CPRs 110-1 to 110-M informs the MPR 105 about the specific content of the updating.

The MPR 105 incorporates the thus-informed content of the updating into the state registers that are resident in the main memory.

The MPR 105 applies only a number indicating a terminal whose state stored in the state register described above is proper as a destination party among the numbers included in a record obtained in advance as numbers to be included in a termination processing demand described above.

That is, when the second pilot number service process is applied, meaningless deliveries of a termination processing demand and a rehunting demand between the MPR 105 and the CPR 110-2 can be avoided. Therefore, call setup can be performed efficiently and the quality of the service can be kept high.

The object of the call process described above is a pilot number service call in which all of the originating party, the destination party, and the candidate for the destination party are any one of the terminals 103-11 to 103-1$m$, . . . , or 103-M1 to 103-Mn (subscriber lines 102-11 to 102-1$m$, . . . , or 102-M1 to 102-Mm).

However, where the CPRs 112-1 to 112-N of the inter-office link correspondence sections 106-1 to 106-N cooperate with each other via the communication link 108 under the MPR 105 like the CPRs 110-1 to 110-M described above, the object of such a call process may be, for example, either of the following:

A pilot number service call occurred as an incoming call at the inter-office links 107-11 to 107-1$n$, . . . , and 107-N1 to 107-Nn.

A call (including a transit call) that is not a pilot number service call and occurs at any one of the terminals 103-11 to 103-1$m$, . . . , and 103-M1 to 103-Mm (subscriber lines 102-11 to 102-1$m$, . . . , and 102-M1 to 102-Mm) or the inter-office links 107-11 to 107-1$n$, . . . , and 107-N1 to 107-Nn.

By the way, in the conventional exchange described above, even when either of the first pilot number service process or the second pilot number service process is applied, the MPR 105 is given the originating notices described above by all CPRs accommodating, under themselves, a terminal (subscriber line) that can be an originating party among the CPRs 110-1 to 110-M.

Therefore, the MPR 105 is obliged to execute the processing described above in response to the originating notices at a speed within a degree that the deterioration in service quality is allowable.

However, since originating; calls may occur asynchronously at the subscriber lines 102-11 to 102-1$m$, and 102-M1 to 102-Mm (terminals 103-11 to 103-1$m$, . . . , and 103-M1 to 103-Mm), there is a possibility that loads are temporarily concentrated on the MPR 105 even not during a busy hour. Further, in general, the maximum load caused by such concentration increases every time the number of subscriber lines to be accommodated 102-11 to 102-1$m$, . . . , and 102-M1 to 102-Mm (terminals 103-11 to 103-1$m$, . . . , and 103-M1 to 103-Mm) increases.

Therefore, the throughput of the MPR 105 should be set in advance at such a value that desired service quality (including call losses that are caused by seizure of such resources as registers) can be secured in consideration of the number of subscriber lines and terminals to be accommodated and the throughput of call processes during a busy hour.

When the first pilot number service process is applied, a termination processing demand and a rehunting demand described above are transmitted and/or received repeatedly between the MPR 105 and the CPR that is connected to a subscriber line (terminal) to be a destination party.

That is, the hardware and software built in the CPRs 110-1 to 110-M, 112-1 to 112-N, and the MPR 105 for interfacing with the communication link 108 are costly because they are required to operate at such a high speed as to secure desired service quality.

When the second pilot number service process is applied, the larger size should be secured for the main memory of the MPR 105, the larger the number of terminals to be a destination party under a pilot number service will be. It is because that state registers are provided in addition to the pilot number selection list 105L described above.

Therefore, in the conventional exchange described above, although load distribution is made by the CPRs 110-1 to 110-M and 112-1 to 112-N, there has been a possibility to be imposed a limitation by the configuration and the scale of the MPR 105 on the number of subscriber lines that can be accommodated and the quality and the combination of services that can be provided.

SUMMARY OF THE INVENTION

An object of the present invention is to provide an exchange which can keep desired load distribution in a stable manner without altering the basic software configuration to a large extent.

Another object of the invention is to execute a call process in a stable manner according to the load distribution without causing local concentration of load.

Another object of the invention is to independently identify a processor that should execute a call process relating to lines to be the candidates for a destination party in a call process relating to the originating party of a pilot number service call, and to execute these call processes efficiently.

Another object of the invention is to optimize, with high determinacy, the hardware scale of databases and the required throughput for the distribution of calls to be subjected to call processes.

Another object of the invention is to enable call processes according to a variety of procedures and forms and to increase the completed call ratio.

A further object of the invention is to prevent the occurrence of an uncompleted call due to occurrence of a certain call that is different from the pilot number service call, at a line being a candidate for a destination party of a pilot number service call.

Still another object of the invention is to ease the reduction of the transmission efficiency of a communication link and the efficiency of a call process due to transmitting and/or receiving of divided messages between processors that execute a call process in cooperation.

Another object of the invention is to allocate processors to a plurality of concurrent calls without causing excessive deviations of loads.

Another object of the invention is to execute, as an internal processing, a call process for a pilot number service call when the degree of overload or congestion is high.

Another object of the invention is to flexibly adapt to a variety of operation and maintenance systems without the need for altering the basic software configuration.

Another object of the invention is to allocate excess throughput to call processes for concurrent calls without causing excessive deviations.

Another object of the invention is to flexibly adapt to the distribution of calls to become objects of parallel call processes and to allocate throughput to these call processes without causing excessive deviations.

Another object of the invention is to heighten the completed call ratio of pilot number service calls.

Another object of the invention is to enable thorough load distribution while utilizing major modules of existing software, and to cut down on labor relating to the maintenance and operation and to improve the service quality and the reliability.

The above objects are attained by an exchange comprising a plural number of distributed call processing means for executing call processes according to a load distribution by cooperating with each other via a communication link, for each combination of accommodated lines each being subscriber lines, interior wires, incoming lines, or outgoing lines, wherein the distributed call processing means have respective databases reporting to a distributed call processing means which is to execute a call process relating to a line to become a candidate for a destination party or an outgoing line in accordance with a result of routing, and directly cooperate with a distributed call processing means that executes a call process relating to a destination party by referring to the databases.

In this exchange, a call process is executed in such a manner that the distributed call processing means directly cooperate with each other via the communication link without intervention of a means that takes the lead in managing the distributed call processing means.

Therefore, call processes can be executed in a stable manner according to the load distribution without concentration of loads on a particular means as long as the throughput of the distributed call processing means and the transmission rate of the communication link are set at such large values that desired service quality can be secured for the maximum number of calls that may concentrate during the busy hour.

The above objects are attained by an exchange in which the databases serve for identification of a distributed call processing means to execute a call process for a line that has become a candidate for a destination party of a pilot number service call.

In this exchange, a call process for a pilot number service call is efficiently executed because a distributed call processing means that should execute a call process relating to a line to become a candidate for a destination party is identified according to the load distribution by a distributed call processing means that executes a call process relating to an originating party.

The above objects are attained by an exchange in which databases are provided in a distributed manner in only distributed call processing means that should execute call processes for lines that can be candidates for a destination party for each multihunting group, to thereby avoid meaningless redundancy.

In this exchange, pieces of identification information to be registered in advance to the databases are limited to ones corresponding to only pilot number service calls for which call processes are executed by the distributed call processing means having the databases.

Therefore, the hardware scale of the databases and the throughput required for the distributed call processing means are optimized with high determinacy for the distribution of calls for which call processes are executed by the distributed call processing means.

The above objects are attained by an exchange in which databases are constructed for only multihunting groups that can be the originating party of the pilot number service call corresponding to each multihunting group, and provided in a distributed manner in distributed call processing means that should execute a call process relating to the line of the originating party.

In this exchange, pieces of identification information to be registered in advance to the databases are limited to ones corresponding to only pilot number service calls for which call processes are executed by the distributed call processing means having the databases.

Therefore, the hardware scale of the databases and the throughput required for the distributed call processing means are optimized with high determinacy for the distribution of calls for which call processes are executed by the distributed call processing means.

The above objects are attained by an exchange in which each distributed call processing means monitors the state of a line to become a object of a call process and executes a call process that is adaptive to the state.

In this exchange, by recognizing, in a call process, the state of such a line in a call process, the distributed call processing means can fitly seize distributed call processing means, interfacing means, and other resources of which the possibility that a call as a object of the call process will become a completed call is high or the possibility that such a call will become an uncompleted call is low.

Therefore, call processes according to a variety of procedures and systems are enabled and the completed call ratio can be increased.

The above objects can be attained by an exchange in which the degree of overload of the respective distributed call processing means and the degree of congestion of the lines for which call processes should be executed by the distributed call processing means are monitored and these distributed call processing means execute call processes while fitly referring to monitoring results.

In this exchange, by recognizing, in a call process, the degree of overload or the degree of congestion, the distributed call processing means can fitly seize distributed call processing means, interfacing means, and other resources of which the possibility that a call as a object of the call process will become a completed call is high or the possibility that such a call will become an uncompleted call is low.

Therefore, the procedure and the system of a call process are made more flexible and the completed call ratio can be heightened.

The above objects can be attained by an exchange in which lines that have become candidates for a destination party of a pilot number service call are tentatively seized until a point in time when the pilot number service call is determined as either a completed call or an uncompleted call.

In this exchange, the above-described lines are prevented from being allocated in a call process for a call other than a pilot number service call. Therefore, the completed call ratio of pilot number service calls can be increased.

The above objects can be attained by an exchange in which pieces of information indicating candidates for a destination party of a pilot number service call are delivered in a lump sum between distributed call processing means via the communication link.

In this exchange, pieces of identification information indicating candidates for a destination party of a pilot number service call are delivered in plurals each time or all together in a lump sum between distributed call processing means that execute a call process relating to the pilot number service call while cooperating with each other via the communication link.

Therefore, the transmission efficiency of the communication link and the efficiency of call processing are prevented from decreasing because of the dividing loss of a message.

The above objects can be attained by an exchange in which, among lines to become candidates for a destination party, the maximum number of lines for which the approvability of a termination to be judged is predetermined.

In this exchange, even if the number of lines to become candidates for a destination party for a pilot number service call that actually occurs is large and certain calls have occurred in advance or certain troubles have occurred in the majority of these lines, the throughput of the distributed call processing means that serves for determination of a destination party is restricted so as to be smaller than or equal to an maximum value.

Therefore, the throughput of the distributed call processing means can be allocated to calls to become objects of parallel call processes without excessive deviations, and these call processes are executed stably according to the load distribution.

The above objects can be attained by an exchange in the case when it is recognized that terminations on candidates for a destination party of the same number as the maximum value is impossible, a termination process is executed for a candidate when there are any candidates of the line of an originating party and a destination party commonly accommodated under a distribution call processing means.

In this exchange, even if the number of lines to become candidates for a destination party for a pilot number service call that actually occurs is large and certain calls have occurred in advance or certain troubles have occurred in the majority of these lines, multihunting is attempted when an originating party and one of the lines commonly accommodated under the distributed call processing means are candidates for a destination party.

Therefore, if the degree of the above-described overload or congestion is high, a call process for a pilot number service call is continued by a single distributed call processing means that cooperates not via the communication link, but internal processing.

The above objects can be attained by an exchange in the case when it is recognized that terminations on candidates for a destination party of the same number as the maximum value is impossible, control information indicating whether to apply the invention or not is given as office data and the distributed call processing means executes a process adaptive for use with the office data.

In this exchange, the applicability of the invention is determined in accordance with the values of pieces of control information that are given to each distributed call processing means. Therefore, flexible adaptation to the systems of operation and maintenance of the exchange according to the invention is enabled without the need for altering the basic software configuration.

The above objects can be attained by an exchange in which pieces of control information are given for each multihunting group.

In this exchange, the approvability of application of the invention is determined in accordance with the values of pieces of control information that are given to the respective distributed call processing means for each multihunting group.

Therefore, flexible adaptation to a variety of systems of operation and maintenance is enabled without the need for altering the basic software configuration.

The above objects can be attained by an exchange in which the maximum value is updated to a value that is adapted to the individual distributed call processing means and the states of the lines accommodated under the distributed call processing means.

In this exchange, the more difficult it is to secure resources for a call process, the smaller the values are set for the throughput of the distributed call processing means that serve for selection of a destination party for a pilot number service call that has actually occurred from candidates for the destination party.

Therefore, the throughput of the distributed call processing means can be allocated to calls to become objects of parallel call processes without excessive deviations, and these call processes are executed stably according to load distribution.

The above objects can be attained by an exchange in which the states of the distributed call processing means and the lines are monitored for each multihunting group and the maximum value is updated to a value that is adapted to these states.

In this exchange, the higher the degree of either or both the overload and the congestion that are monitored by each of the plural number P of surveillance means is, the smaller the maximum value is set by the plural number P of distributed call processing means, for the multihunting group indicating candidates for the destination party of the pilot number service call that is the object of the call process and the distributed call processing means accommodating under itself a line of an originating party of the pilot number service call.

Therefore, the throughput of the distributed call processing means is allocated flexibly without excessive deviations for the distribution of calls to become objects of parallel call processes.

The above objects can be attained by an exchange in which the operating states of the distributed call processing means are watched and databases (pilot number selection lists) that are provided in only distributed call processing means whose operating states are normal are referred to in a call process.

In this exchange, lines to become candidates for a destination party of a pilot number service call are determined by databases given only from distributed call processing means that are operating normally.

Therefore, pilot number service calls become completed calls at a high probability.

Further, the above objects are attained by an exchange that is provided with a processor corresponding to an MPR and in which each distributed call processing means executes a call process according to the load distribution by cooperating with each other in the same manner as in the conventional exchange when the processor is normal and cooperating with each other directly via the communication link when the processor is abnormal.

In this exchange, even if a certain trouble occurs in the main processor, a call process for a call that has occurred at each line is continued stably according to the load distribution under cooperation between the distributed call processing means via the communication link.

Therefore, the invention can be applied to the conventional exchange without the need for altering the software configuration to a large extent.

Other objects and features of the invention will be apparent from the following description taken in connection with the accompanying drawings.

BRIEF DESCRIPTION OF THE DRAWINGS

FIG. 9 is a block diagram showing the configuration of a conventional exchange in which load distribution and functional distribution are made;

FIG. 10 is a chart showing a structure of a pilot number selection list; and

FIG. 11 is a chart showing the operation of the conventional exchange.

DESCRIPTION OF THE PREFERRED EMBODIMENTS

First, the principles of exchanges according to the present invention will be described.

Figure 1:
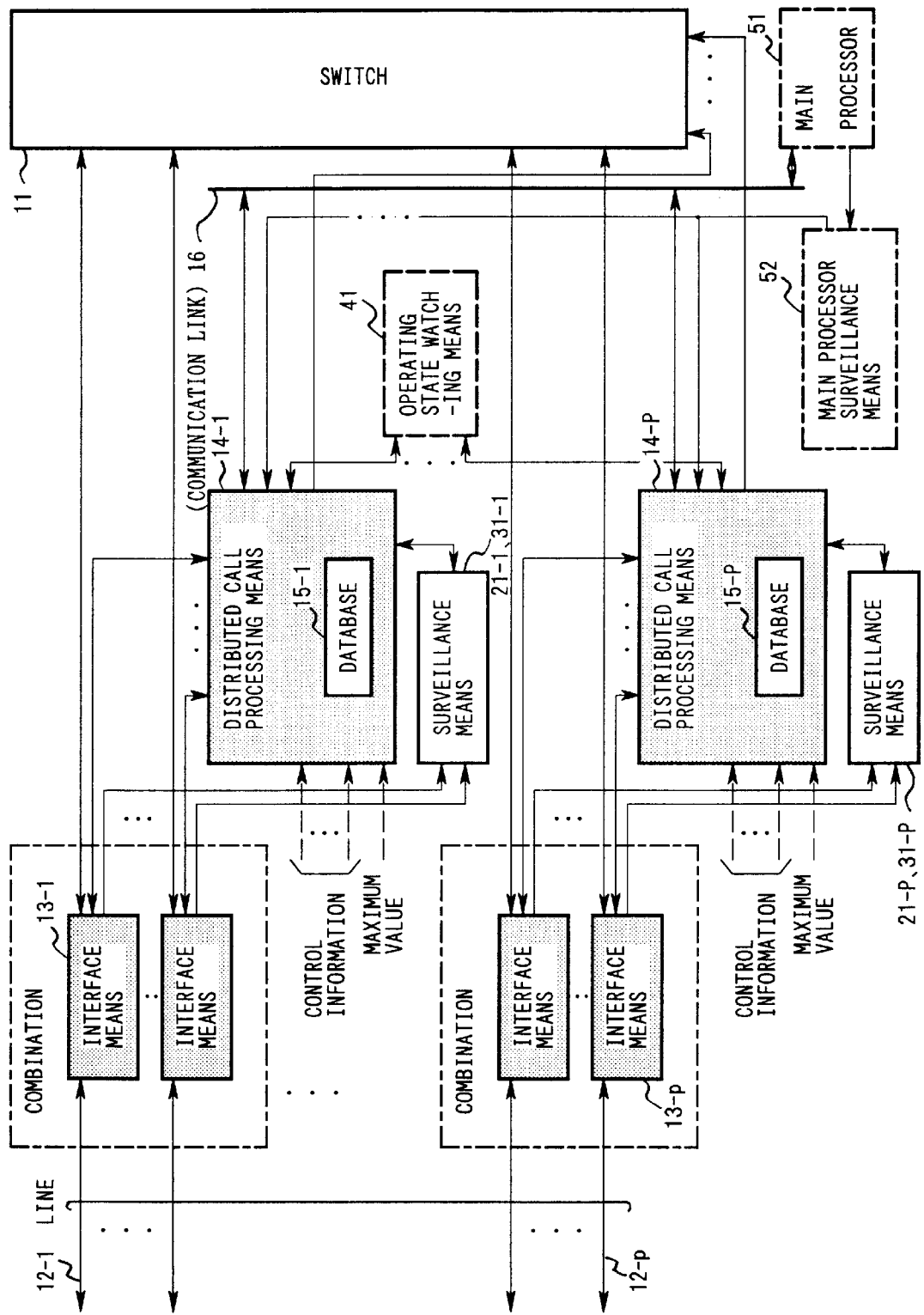
FIG. 1 is a block diagram showing the principle of the present invention.

FIG. 1 is a block diagram showing the principle of the invention.

A first exchange according to the invention comprises a switch 11 for forming a speech path in accordance with an external instruction; a plural number p of interfacing means 13-1 to 13-p for line interfacing individually between corresponding ports of the switch 11 and a plural number p of lines each being either subscriber lines, interior wires, incoming lines, or outgoing lines; a plural number P of distributed call processing means 14-1 to 14-P for executing call processes relating to lines individually pertaining to their respective combinations, for every plural number P of combinations constituted by dividing the plural number p of interfacing means 13-1 to 13-p, where P is smaller than p, and for individually supplying the switch 11 with an instruction adaptive to the call processes, wherein the plural number P of distributed call processing means 14-1 to 14-P have respective databases 15-1 to 15-P on routing results, in which piece(s) of identification information of a single or a plurality of distributed call processing means to execute a call process relating to a destination party or an outgoing line is/are registered in advance, and execute the call process by cooperating, via a communication link 16 or an internal processing, with a distributed call processing means that is signified by individual piece(s) of identification information obtained by referring to the databases 15-1 to 15-P.

The principle of the first exchange according to the invention is as follows.

For each of the P combinations produced by dividing the interfacing means 13-1 to 13-p, a call process relating to a line indicated by any of symbols 12-1 to 12-p and connected to the corresponding distributed call processing means via the interfacing means individually pertaining to their respective combinations is executed in such a manner that the distributed call processing means 14-1 to 14-P directly cooperate with each other via the communication link 16 without the means that takes the lead in managing the distributed call processing means 14-1 to 14-P.

Therefore, call processes can be executed in a stable manner according to the load distribution without concentration of loads on a particular means as long as the throughput of the distributed call processing means 14-1 to 14-P and the transmission rate of the communication link 16 are set at such large values that desired service quality can be secured for the maximum number of calls that may concentrate during the busy hour.

A second exchange according to the invention is configured in such a manner that, in the first exchange, all or part of the plural number p of interfacing means 13-1 to 13-p line interfaces between a plural number m of subscriber lines or interior wires where a pilot number service call may occur, where m is smaller than or equal to p, and corresponding ports of the switch 11; pieces of identification information of each distributed call processing means to execute a call process relating to each line which is to be a candidate for a destination party of the pilot number service call among the a plural number P of the distributed call processing means 14-1 to 14-P are registered in the databases 15-1 to 15-P for each multihunting group; and the P distributed call processing means 14-1 to 14-P each sequentially acquire pieces of identification information registered in the databases 15-1 to 15-P in correspondence with a multihunting group of a pilot number service call to become a object of the call process, and individually select a destination party by cooperating with a distributed call processing means signified by the acquired piece of identification information.

The principle of the second exchange according to the invention is as follows.

The distributed call processing means 14-1 to 14-P have the respective databases 15-1 to 15-P and can refer to these databases 15-1 to 15-P according to the procedure of a call process.

Therefore, a call process for a pilot number service call that has occurred at a line accommodated under the distributed call processing means 14-1 to 14-P via the interfacing means 13-1 to 13-p is efficiently executed in such a manner that a distributed call processing means that should execute a call process relating to a line to become a candidate for a destination party is identified according to the load distribution by a distributed call processing means that executes a call process relating to an originating party.

A third exchange according to the invention is configured in such a manner that, in the second exchange, a combination of pieces of identification information for each multihunting group is registered only in databases 15-1 to 15-P belonging to distributed call processing means signified by the pieces of identification information included in the combination among the plural number P of distributed call processing means 14-1 to 14-P; and the plural number P of distributed call processing means 14-1 to 14-P refer to databases 15-1 to 15-P adaptive for use in the procedure of the call process via a communication link 16 or internal processing.

The principle of the third exchange according to the invention is as follows.

Pieces of identification information to be registered in advance to the databases 15-1 to 15-P are limited to ones corresponding to only pilot number service calls for which call processes are executed by the distributed call processing means 14-1 to 14-P having the databases 15-1 to 15-P.

Therefore, the hardware scale of the databases 15-1 to 15-P and the throughput required for the distributed call processing means 14-1 to 14-P are optimized with high determinacy for the distribution of calls for which call processes are executed by the distributed call processing means 14-1 to 14-P.

A fourth exchange according to the invention is configured in such a manner that, in the second exchange, for each multihunting group, a combination of pieces of identification information of the multihunting group is registered only in databases belonging to distributed call processing means which execute a call process relating to a line that can be an originating party of the pilot number service call among the plural number P of distributed call processing means 14-1 to 14-P; and the plural number P of distributed call processing means 14-1 to 14-P refer to databases adaptive for use in the procedure of the call process among the databases 15-1 to 15-P via a communication link 16 or the internal processing.

The principle of the fourth exchange according to the invention is as follows.

Pieces of identification information to be registered in advance to the databases 15-1 to 15-P are limited to ones corresponding to only pilot number service calls for which call processes are executed by the distributed call processing means 14-1 to 14-P having the databases 15-1 to 15-P.

Therefore, the hardware scale of the databases 15-1 to 15-P and the throughput required for the distributed call processing means 14-1 to 14-P are optimized with high determinacy for the distribution of calls for which call processes are executed by the distributed call processing means 14-1 to 14-P.

A fifth exchange according to the invention is configured in such a manner that, in any of the first to fourth exchanges, the plural number P of distributed call processing means 14-1 to 14-P monitor the state of lines that are accommodated under the plural number P of distributed call processing means 14-1 to 14-P via the plural number p of interfacing means 13-1 to 13-p and are to have a call process executed for a call that has occurred, together with referring, in the call process, to a state information signifying these states or reporting the state information to a distributed call processing means that is in cooperation via the communication link 16.

The principle of the fifth exchange according to the invention is as follows.

By recognizing, in a call process, pieces of identification information indicating the state of lines that are accommodated under the distributed call processing means 14-1 to 14-P via the interfacing means 13-1 to 13-p and a state of lines for an execution of a call process for a call that has occurred, the distributed call processing means 14-1 to 14-P can fitly seize, distributed call processing means, interfacing means, and other resources of which the possibility that a call as a object of the call process will. become a completed call is high or the possibility that such a call will become an uncompleted call is low.

Therefore, call processes according to a variety of procedures and systems are enabled and the completed call ratio can be increased.

A sixth exchange according to the invention is configured in such a manner that, in any of the first to fourth exchanges, it further comprises a plural number P of surveillance means 21-1 to 21-P for individually monitoring the degree of either one or both the overload of the plural number P of distributed call processing means 14-1 to 14-P and the congestion of the lines accommodated under these plural number P of distributed call processing means 14-1 to 14-P via the p interfacing means 13-1 to 13-p, and the plural number P of distributed call processing means 14-1 to 14-P refer, in the call process, to the degree of either one or both of overload and the degree of congestion that are monitored by the plural number P of surveillance means, 21-1 to 21-P or report the degree of either or both the overload and the congestion to a distributed call processing means that is in cooperation via the communication link 16.

The principle of the sixth exchange according to the invention is as follows.

By recognizing, in a call process; the degree of overload of the P distributed call processing means 14-1 to 14-P and the degree of congestion of the lines accommodated under the P distributed call processing means 14-1 to 14-P via the p interfacing means 13-1 to 13-p, the distributed call processing means 14-1 to 14-P can fitly seize, distributed call processing means, interfacing means, and other resources of which the possibility that a call as a object of the call process will become a completed call is high or the possibility that such a call will become an uncompleted call is low.

Therefore, the procedure and the system of a call process are made more flexible and the completed call ratio can be raised.

A seventh exchange according to the invention is configured in such a manner that, in any of the second to sixth exchanges, the plural number P of distributed call processing means 14-1 to 14-P individually seize lines that are the candidates for a destination party of the pilot number service call among the lines accommodated under the plural number P of distributed call processing means 14-1 to 14-P via the plural number p of interfacing means 13-1 to 13-p, and release these lines according to the call processing procedure.

The principle of the seventh exchange according to the invention is as follows.

Lines that have become candidates for a destination party of a pilot number service call among the lines accommodated under the distributed call processing means 14-1 to 14-P via interfacing means 13-1 to 13-p are seized by the distributed call processing means 14-1 to 14-P until a point in time when it is determined that one of these lines is identified as a destination party or the pilot number service call will become an uncompleted call.

Therefore, occurrence of a useless uncompleted call that is caused by a certain call that occurs at these lines and is different from the above-described pilot number service call can be prevented.

An eighth exchange according to the invention is configured in such a manner that, in any of the second to seventh exchanges, among the combinations of pieces of identification information registered in the respective databases 15-1 to 15-P, the plural number P of distributed call processing means 14-1 to 14-P transmit, to the communication link 16, a combination of pieces of identification information a distributed call processing means that oppose the distributed call processing means refers to in the call process via a communication link 16, wherein the transmission is done in a form of a message including an sequence of a plurality of or all of the pieces of identification information included in the combinations.

The principle of the eighth exchange according to the invention is as follows.

Pieces of identification information indicating candidates for a destination party of a pilot number service call are delivered in a plurals each time or all together in a lump sum between distributed call processing means that execute a call process relating to the pilot number service call while cooperating with each other via the communication link 16.

Therefore, the transmission efficiency of the communication link 16 and the efficiency of call processing are prevented from decreasing because of the dividing loss of the above-described message.

A ninth exchange according to the invention is configured in such a manner that, in any of the second to eighth exchanges, the maximum value of the number of lines to be judged of the approvability of termination is given in advance for each multihunting group, among lines to become candidates for a destination party, and the plural number P of distributed call processing means 14-1 to 14-P individually judge the approvability of termination only on the number of candidates for a destination party that is smaller than or equal to the maximum value.

The principle of the ninth exchange according to the invention is as follows.

Even if the number of lines to become candidates for a destination party for a pilot number service call that actually occurs is large and certain calls have occurred in advance or certain troubles have occurred in the majority of these lines, for each multihunting group the throughput of the distributed call processing means 14-1 to 14-P that serves for determination of a destination party is restricted so as to be smaller than or equal to an maximum value of the number of lines for which the approvability of termination should be judged among lines to become candidates for a destination party.

Therefore, the throughput of the distributed call processing means 14-1 to 14-P can be allocated to calls to become objects of parallel call processes without excessive deviations, and these call processes are executed stably according to the load distribution.

A 10th exchange according to the invention is configured in such a manner that, in the ninth exchange, when all results of the judgment relating to the candidates for the number of the destination parties that is smaller than or equal to the maximum value are negative, the plural number P of distributed call processing means 14-1 to 14-P judge whether lines that are accommodated together with an originating party of a corresponding pilot number service call under distributed call processing means are included in the candidates other than the candidates, and judge the approvability of termination on these lines when the results of the judgment are affirmative.

The principle of the 10th exchange according to the invention is as follows.

Even if the number of lines to become candidates for a destination party for a pilot number service call that actually occurs is large and certain calls have occurred in advance or certain troubles have occurred in the majority of these lines, multihunting is attempted when an originating party and one of the lines commonly accommodated under the distributed call processing means are candidates for a destination party.

Therefore, if the degree of the above-described overload or congestion is high, a call process for a pilot number service call is continued by a single distributed call processing means that cooperates not via the communication link 16 but internal processing.

An 11th exchange according to the invention is configured in such a manner that, in the 10th exchange, a piece of control information is given as office data and the plural number P of distributed call processing means 14-1 to 14-P individually judge the possibility of termination for the lines that are accommodated together with the originating party of the pilot number service call under the distributed call processing means as only when pieces of control information have a particular value.

The principle of the 11th exchange according to the invention is as follows.

The appropriateness of application of the invention is determined in accordance with the values of pieces of control information that are given to each distributed call processing means 14-1 to 14-P.

Therefore, flexible adaptation to the systems of operation and maintenance is enabled without the need for altering the basic software configuration.

A 12th exchange according to the invention is configured in such a manner that, in the 10th exchange, among pieces of control information of individual pilot number service calls where pieces of control information are given individually for respective multihunting groups and the pilot number service call is an object of a call process, the plural number P of distributed call processing means 14-1 to 14-P individually judge the approvability of termination of the pilot number service call on the lines that are accommodated together with the originating party under distributed call processing means only when the value of the piece of corresponding control information has a particular value.

The principle of the 12th exchange according to the invention is as follows.

The approvability of the application of the invention is determined in accordance with the values of pieces of control information that are given to the respective distributed call processing means 14-1 to 14-P for each multihunting group.

Therefore, flexible adaptation to a variety of systems of operation and maintenance is enabled without the need for altering the basic software configuration.

A 13th exchange according to the invention is configured in such a manner that, in any of the ninth to 12th exchanges, it further comprises a plural number P of surveillance means 31-1 to 31-P for individually monitoring the degree of either or both the overload of the plural number P of distributed call processing means 14-1 to 14-P and the congestion of the lines individually accommodated under the plural number P of distributed call processing means 14-1 to 14-P via the plural number p of interfacing means 13-1 to 13-p, and the higher the degree of either or both the overload and the congestion that are obtained under the surveillance of each of the plural number P of surveillance means 31-1 to 31-P is, the smaller the maximum value is set by the plural number P of distributed call processing means 14-1 to 14-P.

The principle of the 13th exchange according to the invention is as follows.

The more difficult it is to secure resources for a call process, the smaller the values are set for the throughput of the distributed call processing means 14-1 to 14-P that serve for selection of a destination party for a pilot number service call that has actually occurred from candidates for the destination party.

Therefore, the throughput of the distributed call processing means 14-1 to 14-P can be allocated to calls to become objects of parallel call processes without excessive deviations, and these call processes are executed stably according to the load distribution.

A 14th exchange according to the invention is configured in such a manner that, in the 13th exchange, for each multihunting group, the plural number P of surveillance means 31-1 to 31-P individually monitor the degree of either or both the overload of a plurality of distributed call processing means accommodating under themselves lines to become candidates for a destination party among the plural number P of distributed call processing means 14-1 to 14-P and the congestion of these lines; and the higher the degree of either or both the overload and the congestion, that are monitored by each of the plural number P of surveillance means 31-1 to 31-P is, the smaller the maximum value is set by the plural number P of distributed call processing means 14-1 to 14-P, for the multihunting group indicating candidates for the destination party of the pilot number service call that is the object of the call process and the distributed call processing means accommodating under itself a line of an originating party of the pilot number service call.

The principle of the 14th exchange according to the invention is as follows.

In the above process that is executed by the distributed call processing means 14-1 to 14-P and the surveillance means 31-1 to 31-P, the throughput of the distributed call processing means 14-1 to 14-P is allocated flexibly without excessive deviations irrespective of the distribution of calls to become objects of parallel call processes.

Therefore, the resources can be utilized effectively and the service quality can be kept high.

A 15th exchange according to the invention is configured in such a manner that, in any of the first to 14th exchanges, it further comprises operating state watching means 41 for watching operating states of the plural number P of distributed call processing means 14-1 to 14-P, and the P distributed call processing means 14-1 to 14-P individually refer to databases belonging only to distributed call processing means whose operating states watched by the operating state watching means 41 are normal.

The principle of the 15th exchange according to the invention is as follows.

Lines to become candidates for a destination party of a pilot number service call are determined by databases given only from distributed call processing means that are operating normally among the distributed call processing means 14-1 to 14-P.

Therefore, the completed call ratio of pilot number service calls can be increased.

A 16th exchange according to the invention is configured in such a manner that, in the 15th exchange, it further comprises a main processor 51 for relaying a message that is exchanged in a process where the plural number P of distributed call processing means 14-1 to 14-P cooperate with each other according to a procedure of a call process; and main processor surveillance means 52 for monitoring an,operating state of the main processor 51, wherein the plural number P of distributed call processing means 14-1 to 14-P individually transmit and/or receive the message with a relay by the main processor 51 when the operating state of the main processor 51 monitored by main processor surveillance means 52 is normal, and directly transmit and/or receive the message via the communication link 16 when the operating state of the main processor 51 is abnormal.

The principle of the 16th exchange according to the invention is as follows.

Even if a certain trouble occurs in the main processor 41, a call process for a call that has occurred at the lines 12-1 to 12-p is continued stably according to the load distribution under cooperation between the distributed call processing means 14-1 to 14-P via the communication link 16.

Therefore, the invention can be applied without the need for altering the software configuration to a large extent.

Embodiments of the invention will be hereinafter described in detail with reference to the drawings.

Figure 2:
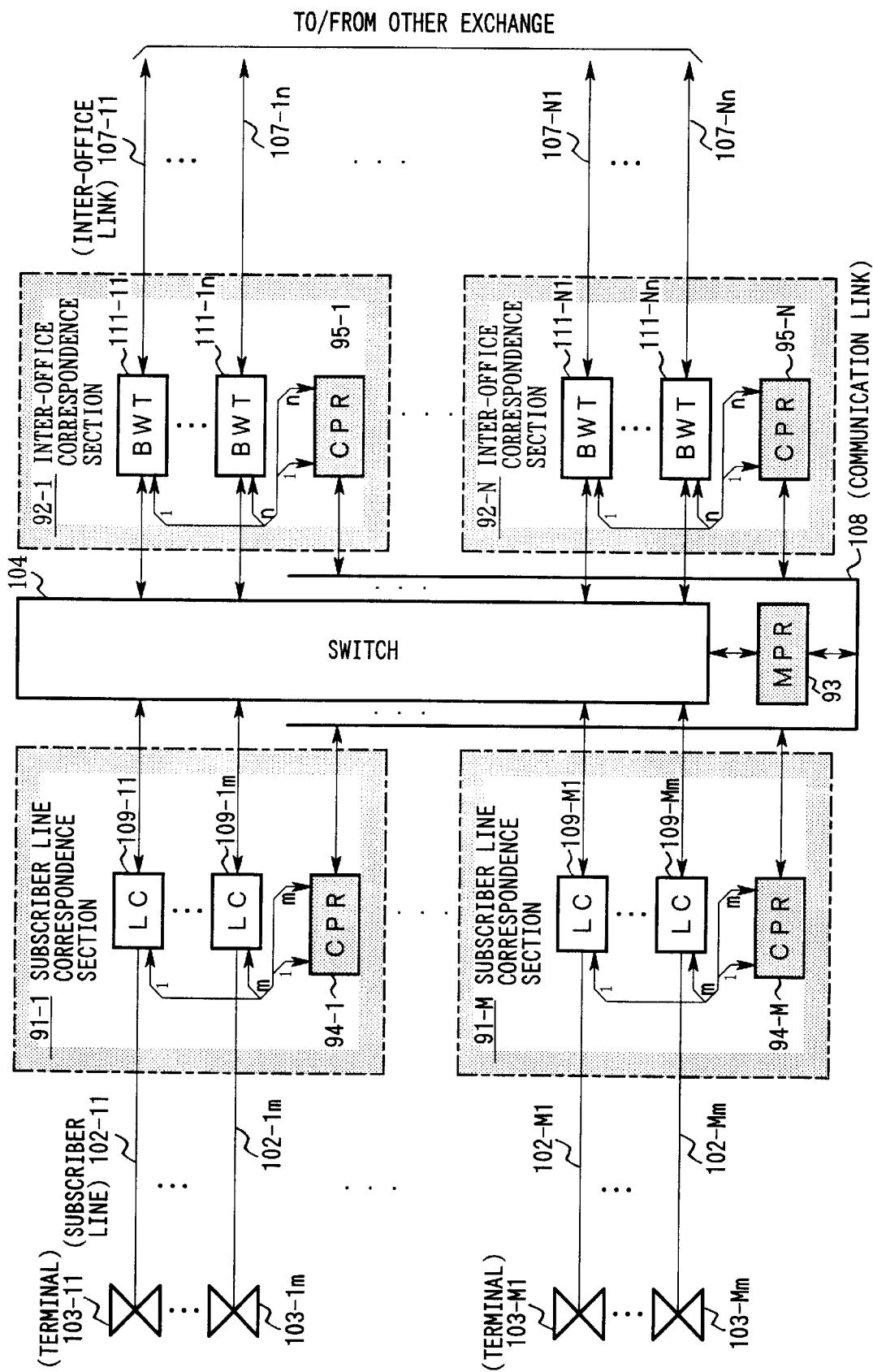
FIG. 2 is a block diagram showing the first to twelfth embodiments of the present invention.

FIG. 2 is a block diagram showing the first to twelfth embodiments of the present invention In the block diagram, the components that have the same function and configuration are indicated by identical reference numerals as in FIG. 9 and the description thereof will be omitted here.

The differences of the configurations between the present embodiment and the prior art shown in FIG. 9 are that subscriber line correspondence sections 91-1 to 91-M are provided instead of the subscriber line correspondence sections 101-1 to 101-M, inter-office link correspondence sections 92-1 to 92-N are provided instead of the inter-office link correspondence sections 106-1 to 106-N, and an MPR 93 is provided instead of the MPR 105.

The subscriber line correspondence section 91-1 is different in configuration from the subscriber line correspondence section 101-1 in that a CPR 94-1 is provided instead of the CPR 110-1.

Since the configuration of the subscriber line correspondence sections 91-2 to 92-M is the same as that of the subscriber line correspondence section 91-1, the components of the former are given reference numerals that are the same as the reference numerals of the corresponding components of the latter and have suffixes "2" to "M" and descriptions therefor will be omitted, in the following.

The inter-office link correspondence section 92-1 is different in configuration from the inter-office link correspondence sections 106-1 in that a CPR 95-1 is provided instead of the CPR 112-1.

Since the configuration of the inter-office link correspondence sections 92-2 to 92-N is the same as that of the inter-office link correspondence section 92-1, the components of the former are given reference numerals that are the same as the reference numerals of the corresponding components of the latter and that have suffixes "2" to "N" and descriptions therefor will be omitted, in the following.

The corresponding relationship between the components of the embodiments and the components shown in FIG. 1 is as follows.

The switch 104 corresponds to the switch 11. Subscriber lines 102-11 to 102-1m, ..., and 102-M1 to 102-Mm and inter-office links 107-11 to 107-1n, ..., and 107-N1 to 107-Nn correspond to the lines 12-1 to 12-p. Subscriber line interface sections 109-11 to 109-1m, ..., and 109-M1 to 109-Mm and inter-office link interface sections 111-11 to 111-1n, ..., and 111-N1 to 111-Nn correspond to the interface means 13-1 to 13-p. CPRs 94-1 to 94-M and 95-1 to 95-N correspond to the distributed call processing means 14-1 to 14-P. Pilot number selection lists 94L-1 to 94L-M, 94Li-1 to 94Li-M, and 94Lj-1 to 94Lj-M described later correspond to the databases 15-1 to 15-P. The communication link 108 corresponds to the communication link 16. The MPR 93 corresponds to the surveillance means 21-1 to 21-P and 31-1 to 31-P, the state watching means 41, the main processor 51, and the main processor surveillance means 52.

Figure 3:
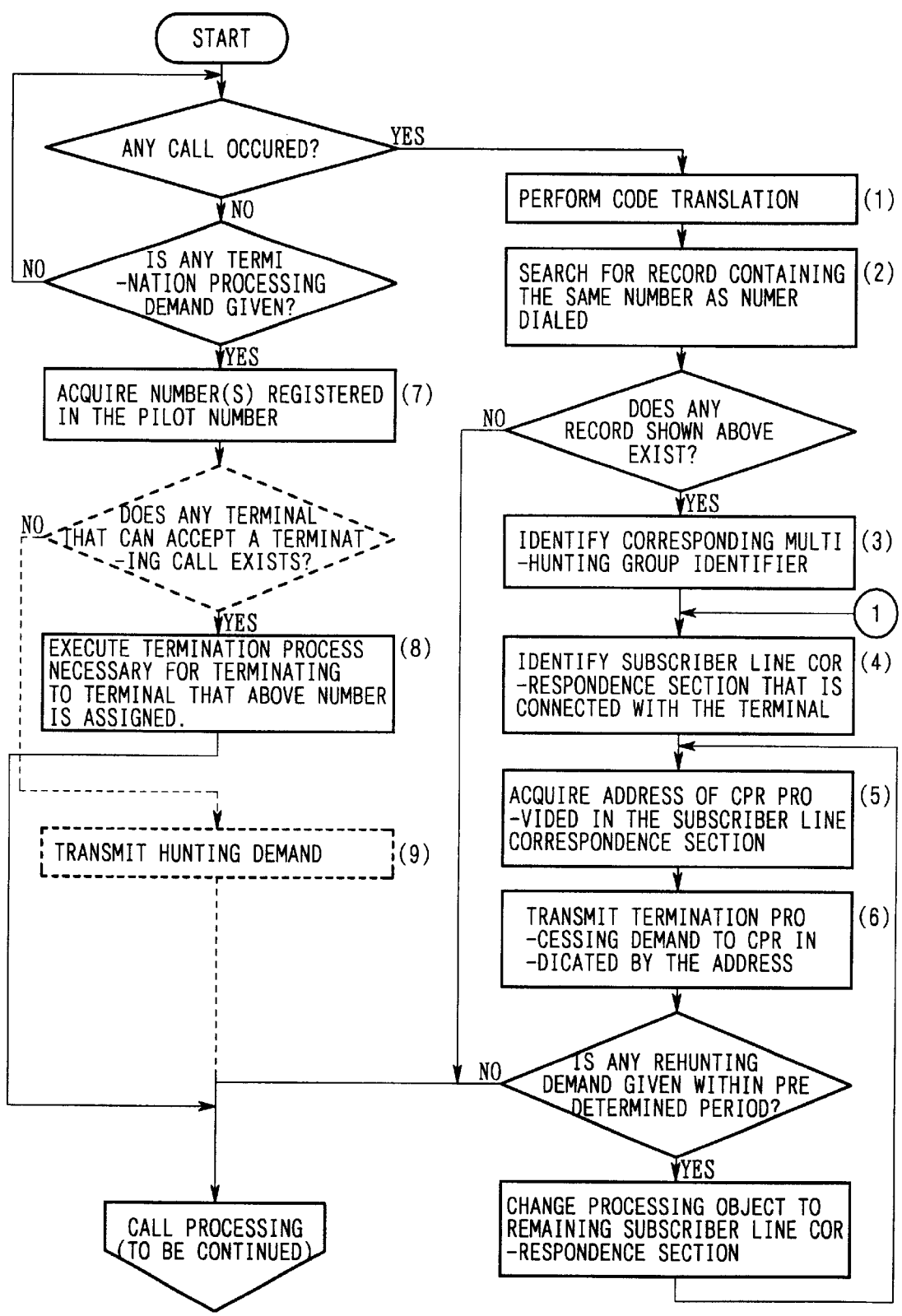
FIG. 3 is a flowchart showing the operation of the first embodiment according to the present invention.

FIG. 3 is a flowchart showing the operation of the first embodiment according to the present invention.

Figure 4:
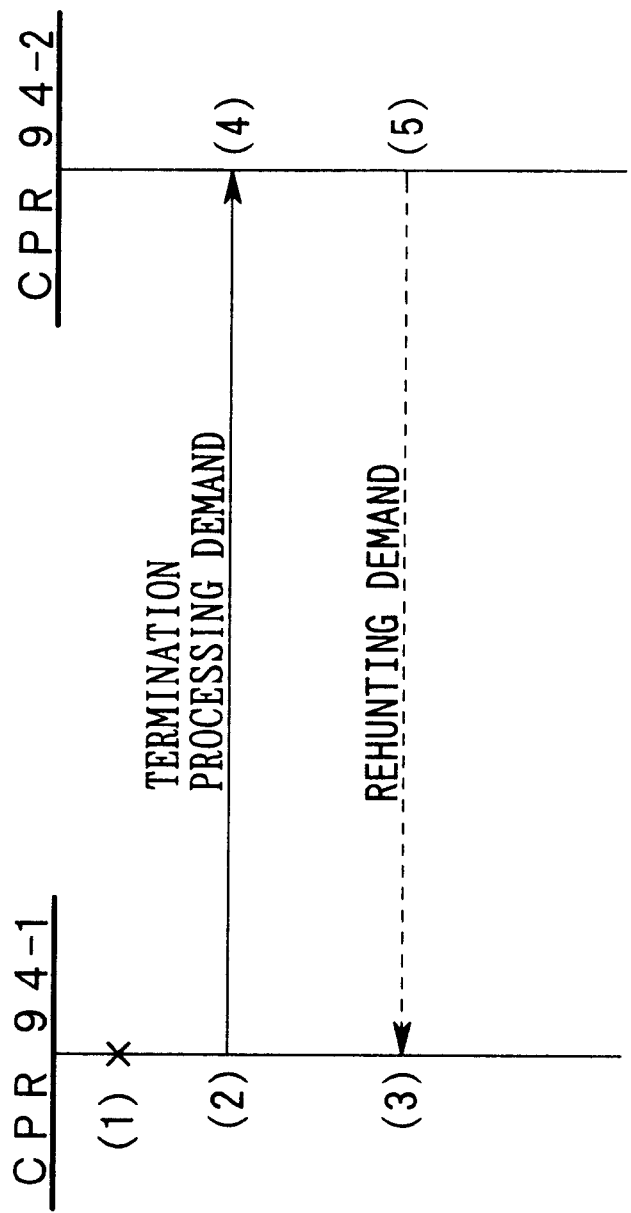
FIG. 4 is a chart for explaining the operation of the first embodiment according to the present invention.

FIG. 4 is a chart for explaining the operation of the first embodiment according to the present invention.

In the following, the operation of the first embodiment according to the present invention will be described with reference to FIGS. 2 through 4.

The pilot number selection list 105L is not allocated in the main memory of the MPR 93.

The pilot number selection lists 94L-1 to 94L-M are allocated respectively, instead of the pilot number selection list 105L, in particular areas of the main memories of the CPRs 94-1 to 94-M.

For the sake of simplicity, it is assumed that each of the pilot number selection lists 94L-1 to 94L-M has the same structure and contents as the pilot number selection list 105L as shown in FIG. 10 where reference numerals 94L-1 to 94L-M are parenthesized.

As in the case of the conventional exchange, when the terminal 103-11 has originated a call that is directed to the terminal 103-21 that belongs to a multihunting group indicated by a multihunting group identifier "2", (indicated as (1) in FIG. 4), the CPR 94-1 incorporates, via the subscriber line 102-11, a number to be dialed that has been set by the terminal 103-11 and performs code translation on the incorporated number (step (1) in FIG. 3).

Then, the CPR 94-1 does not transmit an originating notice including a result of the code translation to the MPR 93 via the communication link 108, and searches for a record containing, in some field, the same number as the number to be dialed among the records of the pilot number selection list 94L-1 (step (2) in FIG. 3).

When there exists such a record, the CPR 94-1 identifies a multihunting group identifier that corresponds to the record (step (3) in FIG. 3).

Then, referring to office data by applying the multihunting group identifier as a key, the CPR 94-1 identifies a single or a plurality of subscriber line correspondence sections that are connected to terminals (for the sake of simplicity, they are assumed here to be the terminals 103-21 to 103-26 and 103-31) that are assigned the respective numbers included in the record described above via the corresponding subscriber line interface sections (step (4) in FIG. 3).

For the sake of simplicity, the subscriber line correspondence sections identified as described above are assumed to be the two subscriber line correspondence sections 101-2 and 101-3.

Then, referring to the office data, the CPR 94-1 acquires a unique address that is assigned in advance to the CPR 94-2 that is provided, as a transmitting end and a receiving end connected to the communication link 108, in the subscriber line correspondence section 101-2 that is one of the above subscriber line correspondence sections 101-2 and 101-3 (step (5) in FIG. 3).

Then, the CPR 94-1 transmits, to the CPR 94-2 indicated by the unique address, via the communication link 108, a termination processing demand that includes the multihunting group identifier identified as described above and means that a termination process described later should be activated (step (6) in FIG. 3; indicated as (2) in FIG. 4).

When the CPR 94-1 receives, in a prescribed period starting from this time point (indicated as (3) in FIG. 4), a rehunting demand meaning that it is impossible to terminate to the terminal that the above number is assigned, as long as any subscriber line correspondence section(s) exists(s) excluding the subscriber line correspondence section that were identified in advance, the CPR 94-1 repeatedly performs the above-described operations (steps (5) and (6) in FIG. 3) for one of the remaining subscriber line correspondence sections.

On the other hand, when the CPR 94-2 recognizes the termination processing demand described above (indicated as (4) in FIG. 4), the CPR 94-2 acquires a single or a plurality of numbers that are registered in the pilot number selection list 94L-2 so as to be correlated with the multihunting group identifier that is included in the termination processing demand among the numbers of the subscriber lines 102-21 to 102-2m under itself (step (7) in FIG. 3).

Then, the CPR 94-2 executes a termination process that is necessary for terminating to a terminal (hereinafter referred to as "candidate for the called terminal") that is connected via a subscriber line that is operating normally at the time point and where no call occurs among the subscriber lines that the above numbers are assigned (step (8) in FIG. 3).

However, in the case when all of the subscriber lines that are assigned all the acquired numbers, respectively, are subscriber lines that are not operating normally or subscriber lines where a certain call occurs, the CPR 94-2 transmits a rehunting demand described above to the CPR 94-1 via the communication link 108 (step (9) in FIG. 3; indicated as (5) in FIG. 4).

As described above, according to the present embodiment, a CPR that has detected an originating call to become an object of a pilot number service directly transmits, via the communication link 108, a termination processing demand to a CPR that should execute a termination process for a subscriber line that can be a candidate for a destination party.

The CPR that has recognized the termination processing demand identifies a proper terminal as a destination party among the subscriber lines under itself irrespective of whether the originating call is a call to become an object of a pilot number service or not and executes the termination process.

Further, even when there are a plurality of terminals that correspond to a multihunting group identifier described above, the termination processing demand described above does not include the numbers that are individually assigned to the terminals but includes the multihunting group identifier.

Therefore, the CPRs 94-1 to 94-M can efficiently perform a prescribed call setting by directly delivering to each other a termination processing demand having a smaller content of information than in the conventional exchange and by cooperating with each other without inclusion of any transit call process to be executed by the MPR 93.

Figure 5:
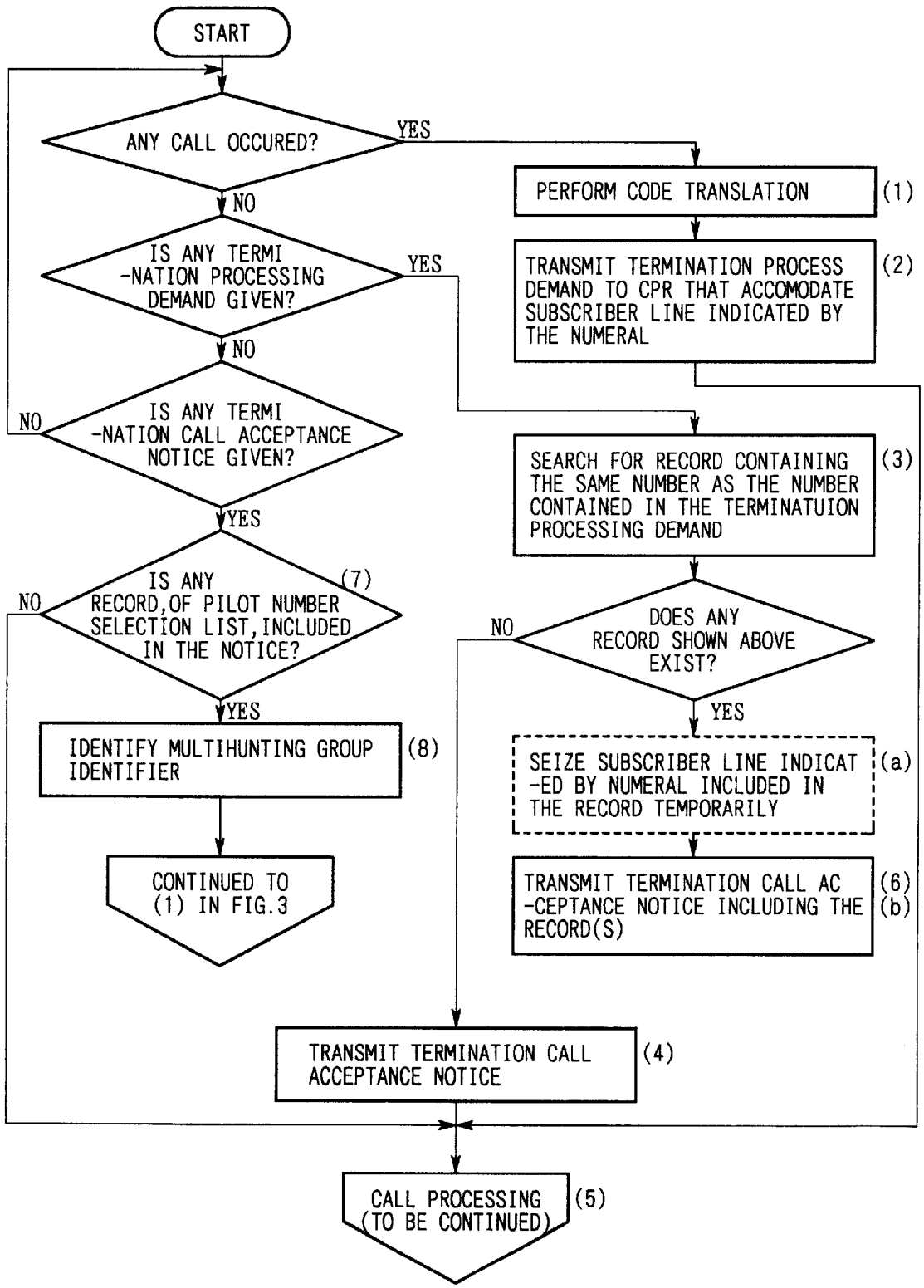
FIG. 5 is a flowchart showing the operation of the second embodiment according to the present invention.

FIG. 5 is a flowchart showing the operation of the second embodiment according to the present invention.

Figure 6:
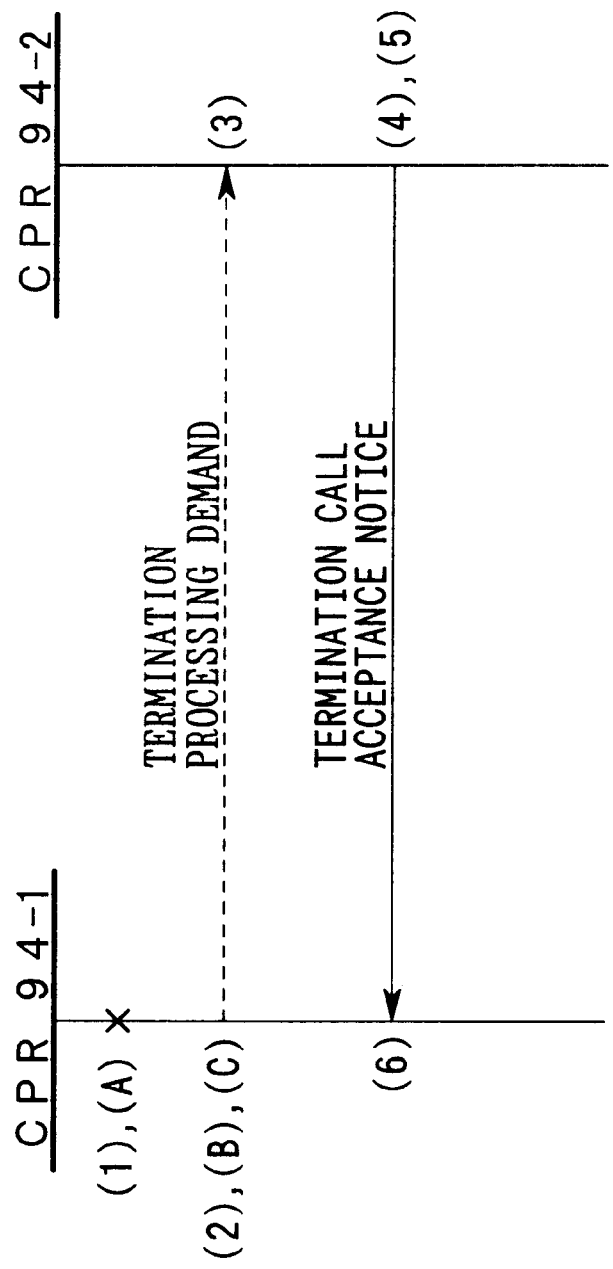
FIG. 6 is a chart for explaining the operation of the second embodiment according to the present invention.

FIG. 6 is a chart for explaining the operation of the second embodiment according to the present invention.

In the following, the operation of the second embodiment according to the present invention will be described with reference to FIGS. 2, 5, and 6.

The second embodiment is different from the first embodiment described above in that pilot number selection lists 94Li-1 to 94Li-M are provided in the respective CPRs 94-1 to 94-M instead of the pilot number selection lists 94L-1 to 94L-M and that the CPRs 94-1 to 94-M execute the following process.

The pilot number selection lists 94Li-1 to 94Li-M including, as candidates for a destination party, for each multihunting group, the numbers of subscriber lines (terminals) that are individually accommodated under the CPRs 94-1 to 94-M are allocated in the main memories of the respective CPRs 94-1 to 94-M instead of the above-described pilot number selection lists 94L-1 to 94L-M.

When the terminal 103-11 has originated a call that is directed to the terminal 103-21 that belongs to the multihunting group indicated by the multihunting group identifier "2" (indicated as (1) in FIG. 6), the CPR 94-1 incorporates a number to be dialed that has been set by the terminal 103-11 and performs code translation on the incorporated number in the same manner as in the first embodiment (step (1) in FIG. 5).

Then, based on a result of the code translation, the CPR 94-1 transmits, via the communication link 108, a termination processing demand including the number to be dialed described above to the CPR 94-2 that accommodates under itself the subscriber line 102-21 (terminal 103-21) to become a destination party (step (2) in FIG. 5; indicated as (2) in FIG. 6).

When the CPR 94-2 recognizes the termination processing demand, the CPR 94-2 extracts the number to be dialed that is included in the termination processing demand and searches for a record that contains, in some field, the same number as the number to be dialed among the records of the pilot number selection list 94Li-2 (step (3) in FIG. 5; indicated as (3) in FIG. 6).

When no such record has been obtained, the CPR 94-2 recognizes, as a destination party, the subscriber line 102-21 (terminal 103-21) that is assigned the number to be dialed.

Then, the CPR 94-2 transmits a termination call acceptance notice meaning that the call concerned is not an object of a pilot number service to the CPR 94-1 via the communication link 108 (step (4) in FIG. 5; indicated as (4) in FIG. 6), and executes a call process relating to the termination call concerned, by cooperating with the CPR 94-1 (step (5) in FIG. 5).

However, when a record described above has been obtained, the CPR 94-2 generates a termination call acceptance notice including the record or all the records of the pilot number selection list 94Li-2 and transmits it to the CPR 94-1 via the communication link 108 (step (6) in FIG. 5; indicated as (5) in FIG. 6).

The CPR 94-1 judges whether the termination call acceptance notice includes any record of the pilot number selection list 95Li-2 described above (step (7) in FIG. 5; indicated as (6) in FIG. 6). When the result of the judgement is true, the CPR 94-1 identifies a record containing the same number as the number to be dialed that was incorporated in advance among the records and also identifies a multihunting group identifier corresponding to the identified record (step (8) in FIG. 5).

However, when the result of the judgement is false, the CPR 94-2 recognizes the originating call as a call not to become an object of pilot number service, and executes a call process relating to the call by cooperating with the CPR 94-1 via the communication link 108.

Since the procedure of a call process that is executed thereafter in such a manner that the CPRs 94-1 and 94-2 cooperate with each other via the communication link 108 is the same as described above in the first embodiment, it is not described here.

As described above, according to the present embodiment, the pilot number selection lists 94L 1 to 94L-M that are allocated in the main memories of the CPRs 94-1 to 94-M in the first embodiment are allocated in the main memories of the CPRs 94-1 to 94-M as the pilot number selection lists 94Li-1 to 94Li-M without meaningless redundancy.

That is, since the size of the main memories of the CPRs 94-1 to 94-M can be made smaller than in the first embodiment, the limitations relating to the hardware standardization, the high-density assembling, the power consumption or the like can be relaxed and the running cost can be reduced.

Figure 7:
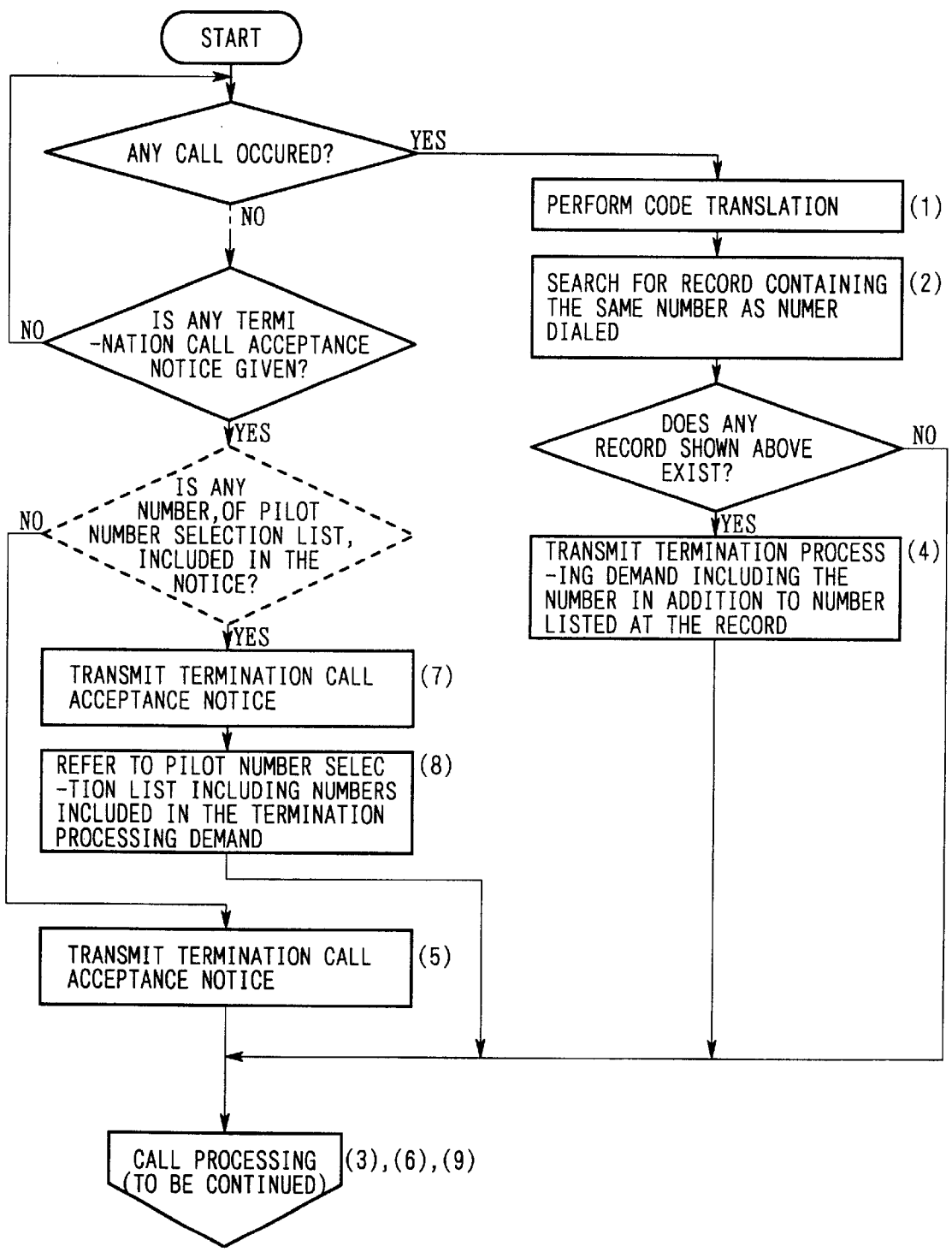
FIG. 7 is a flowchart showing the operation of the third embodiment according to the present invention.

FIG. 7 is a flowchart showing the operation of the third embodiment according to the present invention.

In the following, the operation of the third embodiment according to the present invention will be described with reference to FIGS. 2, 6, and 7.

The present embodiment is different from the second embodiment in that pilot number selection lists 94Lj-1 to 94Lj-M are provided in the respective CPRs 94-1 to 94-M instead of the pilot number selection lists 94Li-1 to 94Li-M and that the CPRs 94-1 to 94-M execute the following process.

The pilot number selection lists 94Lj-1 to 94Lj-M are allocated in the main memories of the respective CPRs 94-1 to 94-M, wherein each of the pilot number selection lists has been generated as a set of records, and each of them is a combination of the numbers of terminals (subscriber lines) that can be a candidate for a destination party for an individual pilot number service call for which the subscriber lines (terminals) accommodated under the CPRs 94-1 to 94-M can be an originating party.

When the terminal 103-11 has originated a call that is directed to the terminal 103-21 that belongs to the multi-hunting group indicated by the multihunting group indicator "2" (indicated as (1) in FIG. 6), the CPR 94-1 incorporates a number to be dialed that has been set by the terminal 103-11 and performs code translation on the incorporated number in the same manner as in the first embodiment (step (1) in FIG. 7).

Then, the CPR 94-1 searches for a record that contains, in some field, the same number as the number to be dialed among the records of the pilot number selection list 94Lj-1 (step (2) in FIG. 7; indicated by character (A) in FIG. 6).

When no such record has been obtained, the CPR 94-1 recognizes, as a destination party, the subscriber line 102-21 (terminal 103-21) that the number to be dialed described above is assigned.

Then, the CPR 94-1 transmits, via the communication link 108, a termination processing demand including the number to be dialed and meaning that the originating call does not become an object of a pilot number service (indicated by character (B) in FIG. 6) and executes a call process relating to the termination call concerned, by cooperating with the CPR 94-2 (step (3) in FIG. 7).

On the other hand, when a record described above can be obtained, the CPR 94-1 generates a termination processing demand including the number to be dialed described above in addition to the number listed at the top of the record and transmits it to the CPR 94-2 via the communication link 108 (step (4) in FIG. 7; indicated as (C) in FIG. 6).

The CPR 94-2 judges whether the thus-received termination processing demand includes the number described above. When the result of the judgement is false, the CPR 94-2 extracts the number to be dialed that is included in the termination processing demand and recognizes, as a destination party, the subscriber line 102-21 (terminal 103-21) that the number to be dialed is assigned.

Then, the CPR 94-2 transmits, via the communication link 108, a termination call acceptance notice meaning that the call concerned has been recognized as a call not to become an object of a pilot number service (step (5) in FIG. 7; indicated as (4) in FIG. 6).

The CPR 94-2 executes a call process relating to the termination call concerned by cooperating with the CPR 941 (step (6) in FIG. 7).

However, when the above-described number is included in the termination processing demand, the CPR 94-2 generates a termination call acceptance notice meaning that the call concerned has been recognized as a call to become an object of a pilot number service (hereinafter referred to as "pilot number service call").

Then, the CPR 94-2 transmits the generated termination call acceptance notice to the CPR 94-1 via the communication link 108 (step (7) in FIG. 7).

Moreover, the CPR 94-2 fitly refers to the pilot number selection list including the numbers that are included in the above-described termination processing demand (step (8) in FIG. 7), and executes a call process for the call concerned by cooperating with the CPR 94-1 in the same manner as in the second embodiment (step (9) in FIG. 7).

As described above, according to the present embodiment, the pilot number selection lists 94L-1 to 94L-M that are allocated in the main memories of the CPRs 94-1 to 94-M in the first embodiment are allocated in a distributed manner in the main memories of the CPRs 94-1 to 94-M as the pilot number selection lists 94Lj-1 to 94Lj-M without meaningless redundancy.

That is, since the size of the main memories of the CPRs 94-1 to 94-M can be made smaller than in the first embodiment, the limitations relating to the hardware standardization, the high-density assembling, the power consumption, or the like can be relaxed and the running cost can be reduced.

In the second embodiment, since a CPR accommodating under itself a subscriber line of one of a destination party and an originating party identifies a CPR accommodating under itself a subscriber line to become the destination party, a call process can be executed according to the load distribution under cooperation between the CPRs without inclusion of the MPR 93.

In the second and third embodiments, although the pilot number selection lists 94Li-1 to 94Li-M or 94Lj-1 to 94Lj-M are allocated in all the main memories of the respective CPRs 94-1 to 94-M, among the CPRs 94-1 to 94-M, such a pilot number selection list may not be allocated in the main memory of a CPR that accommodates under itself only subscriber lines (terminals) that never become a destination party or an originating party of a call to become an object of a pilot number service.

In the following, the operation of the fourth embodiment according to the present invention will be described with reference to FIG. 2.

The CPRs 94-1 to 94-M monitor, at a prescribed frequency, the states of the respective subscriber lines 102-11 to 102-1*m*, . . . , and 102-M1 to 102-Mm (terminals 103-11 to 103-1*m*, . . . , and 103-M1 to 103-Mm), and manage state information indicating these states individually and in a unified manner without informing the MPR 93 about them.

Further, during a call process described above, the CPRs 94-1 to 94-M fitly refer to such state information as criteria that are used in a permission/refusal judgment relating to providing a desired communication service.

That is, the CPRs 94-1 to 94-M enable load distribution not only for a process relating to the cooperation between a CPR accommodating an originating party subscriber line (terminal) and a CPR accommodating a subscriber line (terminal) to become a destination party or a candidate for it but also for a process relating to the collection and management of the states of the subscriber lines 102-11 to 102-1*m*, . . . , and 102-M1 to 102-Mm (terminals 103-11 to 103-1*m*, . . . , and 103-M1 to 103-Mm).

Therefore, according to the present embodiment, a congestion state due to concentration of loads on the MPR 93 can be prevented more reliably than in the first to third embodiments. Further, the traffic of the communication link 108 can be reduced and the efficiency and the service quality of a call process can be improved.

In the following, the operation of the fifth embodiment according to the present invention will be described with reference to FIG. 2.

The present embodiment is different from the fourth embodiment in the following operation procedure of the CPRs 94-1 to 94-M.

The CPRs 94-1 to 94-M fitly add state information described above to a message that is to be transmitted to the MPR 93 or another CPR to cooperate with via the communication link 108.

On the other hand, the CPRs 94-1 to 94-M or the MPR 93 that have received such a message judges whether to continue a call process for a call concerned or alter the operation procedure by referring to the state information that is added to the message.

As described above, according to the present embodiment, a wider variety of call processes can be executed more flexibly according to the load distribution and the service quality and the added value can be made higher than in the first to fourth embodiments.

In the following, the operation of the sixth embodiment according to the present invention will be described with reference to FIGS. 2, 5, and 6.

The present embodiment is different from the second embodiment in the following operation procedure of the CPR 94-2.

When recognizing a termination processing demand that is received from the CPR 94-1, the CPR 94-2 searches for a record containing, in some field, the same number as a number to be dialed that is included in the termination processing demand among the records of the pilot number selection list 94Li-2 (step(3) in FIG. 5; indicated as (3) in FIG. 6).

Then, in the case when such a record has been obtained, the CPR 94-2 provisionally seizes, as a candidate of a destination party of the termination. call concerned, all subscriber lines (terminals) that are not seized at all at that time point among the subscriber lines (terminals) indicated by individual numbers contained in the record (step (a) in FIG. 5).

Furthermore, the CPR 94-2 transmits a termination call acceptance notice including this record or all the records of the pilot number selection list 94Li-2 to the CPR 94-1 via the communication link 108 (step (b) in FIG. 5; indicated as (5) in FIG. 6), and executes a call process for the call concerned by cooperating with the CPR 94-1 in the same manner as in the second embodiment.

However, when a particular subscriber line (terminal) to become a destination party has been determined according to the procedure of the call process, the CPR 94-2 releases all subscriber lines (terminal) other than the particular subscriber line (terminal) among the subscriber lines (terminals) that have been seized provisionally in the above-described manner.

That is, as for a pilot number service call, a call process is executed in a state that subscriber lines (terminals) as candidates for a destination party are provisionally seized, in such a manner that the CPRs 94-1 and 94-2 cooperate with each other via the communication link 108.

As described above, according to the present embodiment, call origination and a response to another termination call are restricted for the above-described subscriber lines (terminals) as candidates for a destination party during a period when a call process is executed by the CPRs 94-1 and 94-2 and a message relating to the call process is transmitted via the communication link 108. Therefore, a pilot number service call becomes a completed call at a higher probability than in the first and second embodiments.

In the following, the operation of the seventh embodiment according to the present invention will be described with reference to FIG. 2.

The present embodiment is different from the third embodiment in the structure of the termination processing demand described above and the processing procedure that is executed by the CPR 94-2 on the termination processing demand.

When the records of the pilot number selection list 94Li-1 that has been identified in advance contain the numbers of a plurality of subscriber lines (terminals) accommodated under the CPR 94-2, the CPR 94-1 generates a termination processing demand to be transmitted to the CPR 94-2 according to the procedure of a call process by adding all of these numbers to it.

On the other hand, when the CPR 94-2 has recognized the above-described termination processing demand, the CPR 942 sequentially judges whether termination is possible for the individual candidates for the called terminal that are connected via the subscriber lines that the individual numbers included in the termination processing demand are assigned among the subscriber lines 102-21 to 102-2m that are accommodated via the subscriber line interface sections 109-21 to 109-2m under the CPR 94-2.

That is, in the present embodiment, since the traffic of the communication link 108 is reduced, the throughput specific to each of the CPRs 94-1 to 94-M can be used more effectively for a call process and the service quality can be made higher than in the third embodiment.

In the following, the operation of the eighth embodiment according to the present invention will be described with reference to FIG. 2.

The present embodiment is different from the seventh embodiment in the following operation procedure of the CPR 94-2.

The CPR 94-2 is given in advance, as a default value, the maximum value of the number of candidates for the called terminal for which the approvability of termination should be judged to determine a destination party among the candidates for the called terminal that individual numbers included in a termination processing demand described above are assigned.

Further, the CPR 94-2 judges the approvability of termination only for candidates for the called terminal of the same number as the maximum value among the above-described candidates for the called terminal.

As long as the above-described maximum value is set properly, the present embodiment prevents the loads of the CPRs 94-1 to 94-M from unduly increasing in a state that the approvability that a terminal to become a destination party is determined is low because of congestion or some other reason.

In the following, the operation of the ninth embodiment according to the present invention will be described with reference to FIG. 2.

The present embodiment is different from the eighth embodiment in that control information described later is set in the CPR 94-2 as part of office data and that the CPR 94-2 executes the following process.

Binary control information that is set for the CPR 94-2 commonly or for either of the following items is allocated in advance in a particular area of the main memory of the CPR 94-2.

The subscriber lines 102-21 to 102-2m (terminals 103-21 to 103-2m) that are accommodated under the CPR 94-2.

A multihunting group as a set of subscriber lines (terminals) that can be a destination party of either or both of an originating call and a termination call that occur at the subscriber lines 102-21 to 102-2m (terminals 103-21 to 103-2m) and that are to become an object of a pilot number service.

The CPR 94-2 judges the approvability of termination only for candidates for the called terminal of the same number as the above-described maximum value among the candidates for the called terminal in the same manner as in the eighth embodiment.

When a terminal to become a destination party could not be determined based on the above judgement results, the CPR 94-2 refers to control information adapted to the call concerned among the above-described pieces of control information.

Further, when the logical value of the control information indicates that the subsequent process should not be executed, the CPR 94-2 executes a call process according to the same procedure as in the eighth embodiment.

However, the logical value of the control information is different from the above one, the CPR 94-2 judges whether there exists a terminal (hereinafter referred to as "particular candidate for the called terminal") that is accommodated under the CPR 94-1 together with the subscriber line 102-11 (terminal 103-11) that is the originating party of the call concerned among the candidates for the called terminal that were obtained in advance.

When the judgment result is false, the CPR 94-2 suspends the call process related to the call concerned by cooperating with the CPR 94-1.

However, in the case the judgment result is true, the CPR 94-2 judges the approvability of termination only for the particular candidate for the called terminal concerned.

Since such a particular candidate for the called terminal is a terminal that is accommodated under the CPR 94-1 together with the subscriber line 102-11 (terminal 103-11) that is an originating party, message delivery during a termination process is accomplished, without inclusion of the communication link 108, as an inter-task communication (realized by using mail or semaphore, for example) or some other internal processing that is performed by the CPR 94-1.

Accordingly, according to the present embodiment, the completed call ratio can be made higher than in the eighth embodiment while the degree of congestion state is prevented from increasing.

Furthermore, in the present embodiment, a terminal that is accommodated under a CPR together with the subscriber line (terminal) that is an originating party is selected as a particular candidate for the called terminal. For example, when the degree of congestion of the communication link 108 is low, the particular candidate for the called terminal may be a terminal accommodated under any CPR in which the degrees of congestion and overload are lower than prescribed threshold values.

The present embodiment does not refer to for what item, that is, for which of a CPR, subscriber lines (terminals), or a multihunting group, the above-described control information should be set. The control information may be set for any item as long as it has a value that conforms to the forms of maintenance and operation that should be applied to the exchange according to the present invention, the traffic distribution of a network that is connected to the exchange, and other factors. Further, the control information may be fitly updated in accordance with the operating state, the time slot, and other factors.

In the following, the operation of the tenth embodiment according to the present invention will be described with reference to FIG. 2.

The present embodiment is different from the eighth and ninth embodiment in that the above-described maximum value is updated according to the following process.

The CPR 94-2 monitors, at a prescribed frequency, the degrees of congestion and overload of both the following for all pilot number service calls in which the subscriber lines 102-21 to 102-2m (terminals 103-21 to 103-2m) accommodated under the CPR 94-2 can be an originating party or a destination party.

Part of the MPR 93 and the CPRs 94-1 to 94-M that accommodate(s) under themselves the originating party or the destination party.

The communication link 108.

The CPR 94-2 has a register to allocate the above-described maximum value in a prescribed storage area of the main memory, among the above-described CPRs 94-1 to 94-M, the MPR 93 and the communication line 108, each being a factor of varying the load of the CPR 94-2.

Furthermore, the larger the monitored degrees of congestion and overload will be, the smaller the CPR 94-2 sets the corresponding maximum value at.

That is, the heavier the load will be, the more the throughput of the CPR 94-2 is evenly allocated to calls. Therefore, increase in the degrees of a congestion state and an overload state is suppressed more properly and the service quality is kept higher than in a case where the throughput allocation is not updated at all.

The present embodiment does not refer to any criteria to be considered in determining CPRs whose degrees of congestion and overload are to be monitored. Such CPRs may be determined based on any criteria as long as they conform to the forms of maintenance and operation that should be applied to the exchange according to the present invention, the traffic distribution of a network that is connected to the exchange, and other factors. Further, such CPRs may be fitly updated in accordance with the operating state, the time slot, and other factors.

Figure 8:
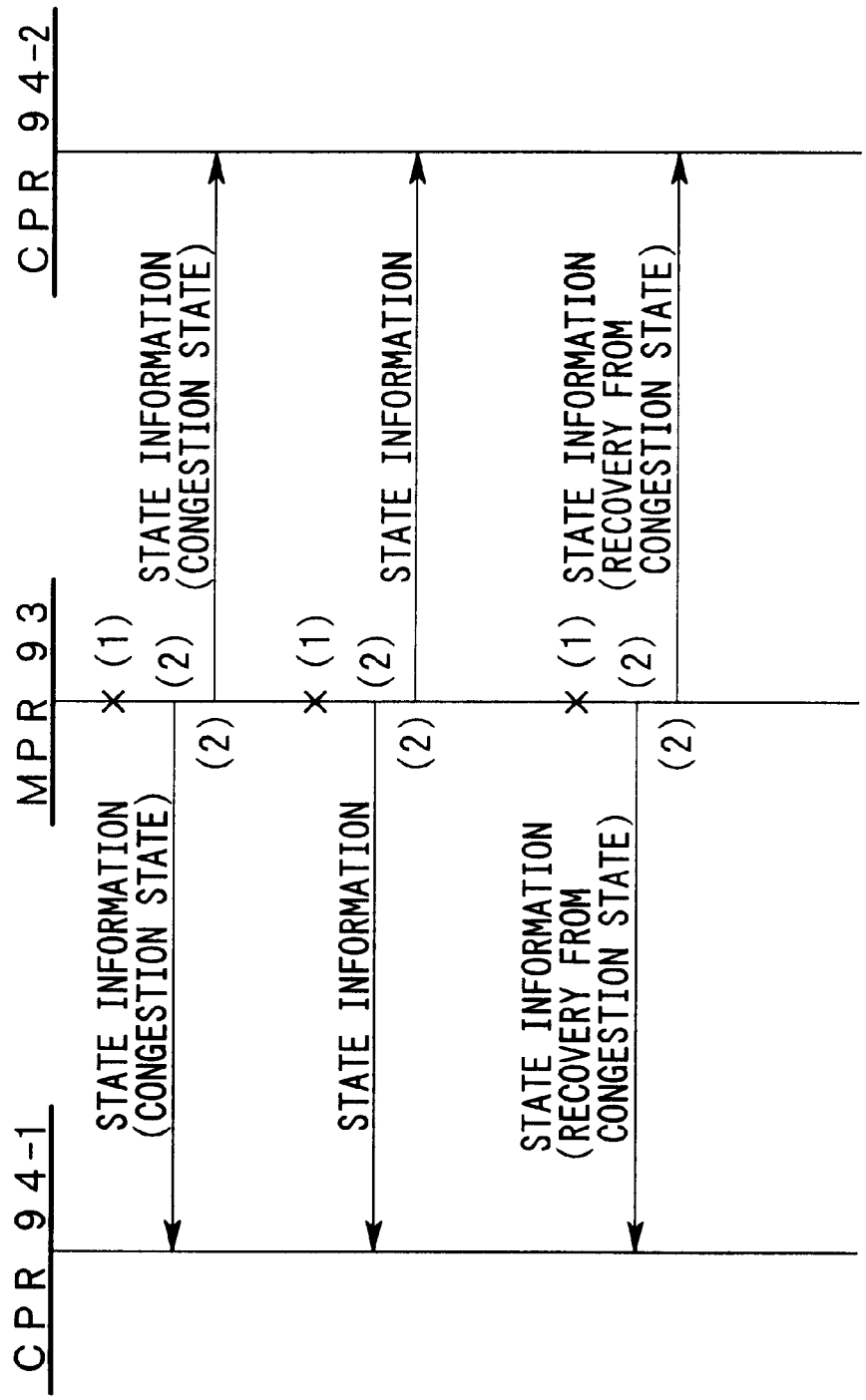
FIG. 8 is a chart for explaining the operations of the eleventh and twelfth embodiments according to the present invention.

FIG. 8 is a chart for explaining the operations of the eleventh and twelfth embodiments according to the present invention.

In the following, the operation of the eleventh embodiment according to the present invention will be described with reference to FIGS. 2 and 8.

The present embodiment is different from the first to tenth embodiments in the following processes to be executed by the CPRs 94-1 to 94-M and the MPR 93.

Cooperating with the CPRs 94-1 to 94-M, the MPR 93 collects, at a prescribed frequency, pieces of state information indicating whether the CPRs 94-1 to 94-M are operating normally without entering to an overload state (indicated as (1) in FIG. 8).

Further, the MPR 93 informs, at a prescribed frequency, the CPRs 94-1 to 94-M about the pieces of state information via the communication link 108 (indicated as (2) in FIG. 8).

On the other hand, the CPR 94-1 to 94-M transmit part or all of the respective pilot number selection lists 94L-1 to 94L-M (94Li-1 to 94Li-M and 94Lj-1 to 94Lj-M) to a desired CPR (hereinafter referred to as "cooperating CPR") in the same manner as in the first and second embodiments.

However, the CPRs 94-1 to 94-M judge whether the state information corresponding to the cooperating CPR indicates that it is operating normally.

The CPRs 94-1 to 94-M exclude a cooperating CPR for which the result of the above judgment is false from the destinations of the pilot number selection lists 94L-1 to 94L-M (94Li-1 to 94Li-M, 94Lj-1 to 94Lj-M) and the demand destinations.

That is, a cooperating CPR that is not operating normally is not accessed uselessly via the communication link 108.

Therefore, the resources including the communication link 108 can effectively be used for call processes for calls that will become a completed call at a high probability, and the overload of the CPRs 94-1 to 94-M and the MPR 93 can be reduced.

In the following, the operation of the twelfth embodiment according to the present invention will be described with reference to FIGS. 2 and 8.

The present embodiment is different from the first to eleventh embodiments in the following processes to be executed by the CPRs 94-1 to 94-M and the MPR 93.

Software that implements both of the process according to any of the first to eleventh embodiments and the process that is executed by the CPRs 110-1 to 110-M of the conventional exchange is incorporated in the CPRs 94-1 to 94-M in the form of a module.

On the other hand, software that implements both of the process of the eleventh embodiment and the process that is executed by the MPR 105 of the conventional exchange is incorporated in the MPR 93 in the form of a module.

Further, the MPR 93 monitors, at a prescribed frequency, whether itself is operating normally without entering to an overload state (indicated as (1) in FIG. 8), and transmits a monitoring result to the CPRs 94-1 to 94-M via the communication link 108 (indicated as (2) in FIG. 8).

The CPRs 94-1 to 94-M execute. the above-described process as the conventional exchange during a period when it is recognized based on a monitoring result that the MPR 93 is operating normally. In such a period, the MPR 93 executes the above-described process as the conventional exchange.

However, when the CPRs 94-1 to 94-M recognize based on a monitoring result that the MPR 93 is defective, they execute the process that was described above in any of the first to eleventh embodiments. In this case, the MPR 93 executes the process that was described above in the eleventh embodiment.

That is, when the MPR 93 is operating normally, the CPRs 94-1 to 94-M cooperate with each other under a transit call process that is executed by the MPR 93. On the contrary, when the MPR 93 operates improperly, the CPRs 94-1 to 94-M cooperate with each other directly via the communication link 108 without inclusion of the MPR 93 in the same manner as in any of the first to tenth embodiments.

Therefore, according to the present embodiment, the invention can be applied to existing exchanges within the confines of the margin of the scale of software that can be installed in the CPRs 94-1 to 94-M and the MPR 93.

In the present embodiment, the CPRs 94-1 to 94-M are informed, under the control of the MPR 93, of a monitoring result obtained by the MPR 93. However, the CPRs 94-1 to 94-M may be informed of such a monitoring result in the form of a prescribed message that is transmitted in response to an inquiry from the CPRs 94-1 to 94-M that cooperate with each other via the communication link 108.

In each of the above-described embodiments, the numbers of terminals to become a candidate for a destination party of a pilot number service call are stored in the pilot number selection lists 94L-1 to 94L-M (94Li-1 to 94Li-M, 94Lj-1 to 94Lj-M).

However, the identification information of CPRs may be stored in the pilot number selection lists 94L-1 to 94L-M (94Li-1 to 94Li-M and 94Lj-1 to 94Lj-M) as long as they are served for identifying the CPRs accommodating under themselves subscriber lines or terminals to become candidates for a destination party as above. Any information enabling identification of such CPRs when referred to together with office data and other information may be stored in the pilot number selection lists 94L-1 to 94L-M (94Li-1 to 94Li-M and 94Lj-1 to 94Lj-M).

In each of the above-described embodiments, both of an originating party and a candidate for a destination party of a pilot number service call are any of the terminals 103-11 to 103-1m, . . . , or 103-M1 to 103-Mm.

However, for example, a call process for a pilot number service call that has occurred as an incoming call at any of the inter-office links 107-11 to 107-1n, . . . , or 107-N1 to 107-Nn may be executed in such a manner that the CPRs 95-1 to 95-N and a CPR that should execute a call process relating to a terminal as a candidate for a destination party cooperate with each other directly via the communication link 108 without inclusion of the MPR 93.

Each of the above embodiments describes the cooperation of the CPRs 94-1 to 94-M in a call process for only a pilot number service call. The CPRs 95-1 to 95-M may execute a call process by cooperating with each other via the communication link 108 without inclusion of the MPR 93 in the same manner as the CPRs 94-1 to 94-M execute a call process in a cooperative manner, also for, for example, an ordinary call in which single, different terminals among the terminals 103-11 to 103-1m, . . . , and 103-M1 to 103-Mm become an originating party and a destination party, respectively, and a transit call that occurs as an incoming call at one of the inter-office links 107-11 to 107-1n, . . . , and 107-N1 to 107-Nn and that should be transferred to an outgoing line that is one of the inter-office links 107-11 to 107-1n, . . . , 107-N1 to 107-Nn.

That is, although the present invention is applied to the subscriber line exchange in each of the above-described embodiments, the present invention can be applied not only to the subscriber line exchange but also to the PBX, the transit exchange, and the gateway exchange.

Each of the above-described embodiments does not refer to the signaling system and the transmission system that are applied to the subscriber lines 102-11 to 102-1m, . . . , and 102-M1 to 102-Mm and the inter-office links 107-11 to 1071n, . . . , and 107-N1 to 107-Nn.

However, any signaling system and transmission system may be employed as long as they enable line interface under the CPRs 94-1 to 94-M and 95-1 to 95-N and allow the CPRs 94-1 to 94-M and 95-1 to 95-N to perform call process by cooperating with each other via the communication link 108 without inclusion of the MPR 93.

Further, although in each of the above-described embodiments the present invention is applied to the exchange that is connected to a line switching network, the present invention can also be applied in a similar manner to an exchange that is connected to a network according to a store and forward switching system or a message switching system as long as a call process is executed according to the above-described load distribution.

The invention is not limited to the above embodiments and various modifications are possible without departing from the spirit and scope of the invention. Any improvements may be made in part or all of the components.

What is claimed is:

1. An exchange comprising:
   a switch for forming a speech path in accordance with an external instruction;
   a plural number p of interfacing means for line interfacing individually between corresponding ports of said switch and a plural number p of lines each being either subscriber lines, interior wires, incoming lines, or outgoing lines; and
   a plural number P of distributed call processing means for executing call processes relating to lines individually pertaining to their respective combinations, for every plural number P of combinations constituted by dividing said plural number p of interfacing means, where P is smaller than p, and for individually supplying said switch with an instruction adaptive to the call processes,
   wherein said plural number P of distributed call processing means have respective databases on routing results, in which piece(s) of identification information of a single or a plurality of distributed call processing means to execute a call process relating to a destination party or an outgoing line is/are registered in advance, and execute the call process by cooperating, via a communication link or an internal processing, with a distributed call processing means that is signified by individual piece(s) of identification information obtained by referring to said databases.

2. The exchange as claimed in claim 1, wherein:
   all or part of said plural number p of interfacing means line interfaces between a plural number m of subscriber lines or interior wires where a pilot number service call may occur, where m is smaller than or equal to p, and a corresponding port of said switch;
   pieces of identification information of each distributed call processing means to execute call process relating to each line which is to be a candidate for a destination party of said pilot number service call among a plural number P of the distributed call processing means are registered in said databases for each multihunting group; and
   said plural number P of distributed call processing means each sequentially acquire pieces of identification information registered in said databases in correspondence with a multihunting group of said pilot number service calls to become an object of the call process, and individually select a destination party by cooperating with a distributed call processing means signified by the acquired piece of identification information.

3. The exchange as claimed in claim 2, wherein:
   a combination of pieces of identification information for each multihunting group is registered only in databases belonging to distributed call processing means signified by the pieces of identification information included in combinations among said plural number P of distributed call processing means; and
   among said databases, said plural number P of distributed call processing means refer to a database adaptive for use in the procedure of said call process via a communication link or internal processing.

4. The exchange as claimed in claim 2, wherein:
   for each multihunting group, a combination of pieces of identification information of the multihunting group is registered only in databases belonging to distributed call processing means which execute a call process relating to a line that can be an originating party of said pilot number service call among said plural number P of distributed call processing means; and
   said the plural number P of distributed call processing means refer to a database adaptive for use in the procedure of said call process among said databases via a communication link or internal processing.

5. The exchange as claimed in claim 1, wherein said plural number P of distributed call processing means monitor the state of lines that are accommodated under said plural number P of distributed call processing means via said plural number p of interfacing means and are to have a call process executed for a call that has occurred, together with referring, in the call process, to a state information signifying the state or reporting the state information to a distributed call processing means that is in cooperation via a communication link.

6. The exchange as claimed in claim 2, wherein said plural number P of distributed call processing means monitor the state of lines that are accommodated under said plural number P of distributed call processing means via said plural number p of interfacing means and are to have a call process executed for a call that has occurred, together with referring, in the call process, to a state information signifying the state or reporting the state information to a distributed call processing means that is in cooperation via a communication link.

7. The exchange as claimed in claim 3, wherein said plural number P of distributed call processing means monitor the state of lines that are accommodated under said plural number P of distributed call processing means via said plural number p of interfacing means and are to have a call process executed for a call that has occurred, together with referring, in the call process, to a state information signifying the state or reporting the state information to a distributed call processing means that is in cooperation via a communication link.

8. The exchange as claimed in claim 4, wherein said plural number P of distributed call processing means monitor the state of lines that are accommodated under said plural number P of distributed call processing means via said plural number p of interfacing means and are to have a call process executed for a call that has occurred, together with referring, in the call process, to a state information signifying the state or reporting the state information to a distributed call processing means that is in cooperation via a communication link.

9. The exchange as claimed in claim 1, further comprising a plural number P of surveillance means for individually monitoring the degree of either or both the overload of said plural number P of distributed call processing means and the congestion of the lines accommodated under these plural number P of distributed call processing means via said plural number p of interfacing means,
   wherein said plural number P of distributed call processing means refer to the degree of either or both the overload and the congestion that are monitored by said plural number P of surveillance means or report the degree of either or both the overload and the congestion to a distributed call processing means that is in cooperation via a communication link.

10. The exchange as claimed in claim 2, further comprising a plural number P of surveillance means for individually monitoring the degree of either or both the overload of said plural number P of distributed call processing means and the congestion of the lines accommodated under these plural number P of distributed call processing means via said plural number p of interfacing means, wherein said plural number P of distributed call processing means refer to the degree of either or both the overload and the congestion that are monitored by said plural number P of surveillance means or report the degree of either or both the overload and the congestion to a distributed call processing means that is in cooperation via a communication link.

11. The exchange as claimed in claim 3, further comprising a plural number P of surveillance means for individually monitoring the degree of either or both the overload of said plural number P of distributed call processing means and the congestion of the lines accommodated under these plural number P of distributed call processing means via said plural number p of interfacing means, wherein said plural number P of distributed call processing means refer to the degree of either or both the overload and the congestion that are monitored by said plural number P of surveillance means or report the degree of either or both the overload and the congestion to a distributed call processing means that is in cooperation via a communication link.

12. The exchange as claimed in claim 4, further comprising a plural number P of surveillance means for individually monitoring the degree of either or both the overload of said plural number P of distributed call processing means and the congestion of the lines accommodated under these plural number P of distributed call processing means via said plural number p of interfacing means, wherein said plural number P of distributed call processing means refer to the degree of either or both the overload and the congestion that are monitored by said plural number P of surveillance means or report the degree of either or both the overload and the congestion to a distributed call processing means that is in cooperation via a communication link.

13. The exchange as claimed in claim 2, wherein said plural number P of distributed call processing means individually seize a line that is the candidate for a destination party of said pilot number service call among the lines accommodated under said plural number P of distributed call processing means via said plural number p of interfacing means, and release the line according to said call processing procedure.

14. The exchange according to claim 2, wherein, among said combinations of pieces of identification information registered in the respective databases, said plural number P of distributed call processing means transmit, to a communication link, a combination of pieces of identification information a distributed call processing means that oppose the said distributed call processing means refers to in said call process via a communication link, wherein the transmission is done in a form of a message including an sequence of a plurality of or all of the pieces of identification information included in the combinations.

15. The exchange as claimed in claim 2, wherein, for each multihunting group, the maximum value of the number of lines to be judged of the approvability of termination is given in advance, among lines to become candidates for a destination party, and said plural number P of distributed call processing means individually judge the approvability of termination only on the number of candidates for a destination party that is smaller than or equal to the maximum value.

16. The exchange as claimed in claim 15, wherein, when all results of said judgment relating to said candidates for the number of said destination parties that is smaller than or equal to said maximum value are negative, the plural number P of distributed call processing means judge whether lines that are accommodated together with an originating party of a corresponding pilot number service call under distributed call processing means are included in the candidates other than the said candidates, and judge the approvability of termination on these lines when the results of said judgment are affirmative.

17. The exchange as claimed in claim 16, wherein a piece of control information is given as office data and said plural number P of distributed call processing means individually judge the approvability of termination for the lines that are accommodated together with the originating party of said pilot number service call under the distributed call processing means only when the piece of control information has a particular value.

18. The exchange as claimed in claim 16, wherein among pieces of control information of individual pilot number service calls where pieces of control information are given individually for respective multihunting groups and the pilot number service call is an object of a call process, the plural number P of distributed call processing means individually judge the approvability of termination of the pilot number service call on the lines that are accommodated together with the originating party under distributed call processing means only when the value of the piece of corresponding control information has a particular value.

19. The exchange as claimed in claim 15, further comprising a plural number P of surveillance means for individually monitoring the degree of either or both the overload of said plural number P of distributed call processing means and the congestion of the lines accommodated under these plural number P of distributed call processing means via said plural number p of interfacing means, wherein the higher the degree of either or both the overload and the congestion that are obtained under the surveillance of each of the plural number P of surveillance means is, the smaller the said maximum value is set by said plural number P of distributed call processing means.

20. The exchange as claimed in claim 19, wherein:

for each multihunting group, said plural number P of surveillance means individually monitor the degree of either or both the overload of a plurality P of distributed call processing means individually accommodating under themselves a line to become the candidate for the destination party among the plural number P of distributed call processing means and the congestion of these lines; and the higher the degree of either or both the overload and the congestion that are monitored by each of said plural number P of surveillance means is, the smaller said maximum value is set by said plural number P of distributed call processing means, for said multihunting group indicating candidates for said destination party of said pilot number service call that is the object of said call process and said distributed call processing means accommodating under itself a line of an originating party of the pilot number:service call.

21. The exchange as claimed in claim 1, further comprising an operating state watching means for watching operating states of said plural number P of distributed call processing means, wherein the plural number P of distributed call processing means individually refer to a database belonging only to distributed call processing means whose operating state watched by the operating state watching means is normal.

22. The exchange as claimed in claim 21, further comprising:
- a main processor for relaying a message that is transmitted and/or received in a process where said plural number P of distributed call processing means cooperate with each other according to the procedure of said call process; and
- a main processor surveillance means for monitoring the operating state of said main processor,
- wherein said plural number P of distributed call processing means individually transmit and/or receive said message with a relay by said main processor when the operating state of said main processor monitored by main processor surveillance means is normal, and directly transmit and/or receive the message via a communication link when the operating state of the main processor is abnormal.

* * * * *